(12) United States Patent
Park et al.

(10) Patent No.: US 12,530,987 B2
(45) Date of Patent: Jan. 20, 2026

(54) METHOD FOR DETERMINING ASSEMBLY SEQUENCE AND GENERATING INSTRUCTION OF ASSEMBLING TOY

(71) Applicant: LEGO A/S, Billund (DK)

(72) Inventors: Hyeonho Park, Billund (DK); Yeon-Mi Yeo, Billund (DK)

(73) Assignee: LEGO A/S, Billund (DK)

( * ) Notice: Subject to any disclaimer, the term of this patent is extended or adjusted under 35 U.S.C. 154(b) by 621 days.

(21) Appl. No.: 17/602,943

(22) PCT Filed: Apr. 10, 2020

(86) PCT No.: PCT/EP2020/060353
§ 371 (c)(1),
(2) Date: Oct. 11, 2021

(87) PCT Pub. No.: WO2020/208247
PCT Pub. Date: Oct. 15, 2020

(65) Prior Publication Data
US 2022/0165177 A1    May 26, 2022

(30) Foreign Application Priority Data
Apr. 12, 2019   (KR) .......................... 10-2019-0043152

(51) Int. Cl.
*G09B 19/00*    (2006.01)
*G06F 30/17*    (2020.01)
(Continued)

(52) U.S. Cl.
CPC ............ *G09B 19/003* (2013.01); *G06F 30/17* (2020.01); *A63H 33/086* (2013.01); *G09B 5/02* (2013.01)

(58) Field of Classification Search
CPC ....... G09B 19/003; G06F 30/17; A63H 33/04; A63H 33/086
See application file for complete search history.

(56) References Cited

U.S. PATENT DOCUMENTS 5,572,639 A    11/1996  Gantt
5,638,499 A     6/1997  O'Connor et al.
(Continued)

FOREIGN PATENT DOCUMENTS

| CN | 1993712 A | 7/2007 |
|---|---|---|
| CN | 101675458 A | 3/2010 |

(Continued)

OTHER PUBLICATIONS

Weblog: "From making to introducing my Lego creation—essential websites and softwares", Apr. 20, 2017 URL: https://apparat.tistory.com/46.
(Continued)

*Primary Examiner* — Peter R Egloff
(74) *Attorney, Agent, or Firm* — Day Pitney LLP; George Chaclas; Anthony A. Kassas

(57) ABSTRACT

A method for determining an assembly sequence of an assembling toy including a plurality of assembling elements disposed in a virtual space, Each of the assembling elements have at least one coupling part complementarily coupled to another coupling part, and connected to another assembling element through the coupling part, including a previously assembled element assembled to the assembling toy in the virtual space and a target assembling element that not yet assembled. The method for determining an assembly sequence includes: determining an assembly group in consideration of an upper surface height of the target assembling element connected to the previously assembled element, the upper surface height is calculated on the basis of a height from a ground to an upper surface of the target assembling element; and determining whether to generate a sub assembly group in consideration of the number of the assembling elements included in the assembly group.

14 Claims, 32 Drawing Sheets

(51) Int. Cl.
　　　*A63H 33/08*　　(2006.01)
　　　*G09B 5/02*　　(2006.01)

(56) References Cited

U.S. PATENT DOCUMENTS

| | | | |
|---|---|---|---|
| 7,012,604 | B1 | 3/2006 | Christie et al. |
| 8,525,826 | B2 | 9/2013 | Nutter et al. |
| 2002/0190984 | A1 | 12/2002 | Seiler et al. |
| 2004/0236539 | A1 | 11/2004 | Clark et al. |
| 2006/0136180 | A1 | 6/2006 | Hansen et al. |
| 2007/0262984 | A1* | 11/2007 | Pruss .................. G06T 19/20 345/420 |
| 2008/0074420 | A1 | 3/2008 | Kuesel et al. |
| 2008/0228450 | A1* | 9/2008 | Jakobsen ............ G06T 19/20 703/2 |
| 2009/0295805 | A1 | 12/2009 | Ha et al. |
| 2010/0114635 | A1 | 5/2010 | Watanabe et al. |
| 2012/0280993 | A1 | 11/2012 | Jakobsen et al. |
| 2013/0069970 | A1 | 3/2013 | Sasaki et al. |
| 2014/0142900 | A1* | 5/2014 | Andre .................. G06F 30/00 703/1 |
| 2015/0012890 | A1* | 1/2015 | Finch .................. G06T 19/20 715/849 |
| 2017/0173486 | A1* | 6/2017 | Rothschild ........... G06V 10/75 |
| 2019/0094841 | A1* | 3/2019 | Denayer .......... G05B 19/41805 |
| 2019/0099686 | A1* | 4/2019 | Barki .................... A63F 13/213 |
| 2020/0051216 | A1 | 2/2020 | Jeffery |

FOREIGN PATENT DOCUMENTS

| | | |
|---|---|---|
| CN | 109558620 A | 4/2019 |
| JP | 2013065100 A | 4/2013 |
| KR | 20070026820 A | 3/2007 |
| KR | 20090125272 A | 12/2009 |
| KR | 20090125545 A | 12/2009 |
| KR | 20120083893 A | 7/2012 |
| KR | 101954824 B | 3/2019 |
| WO | 2011/039041 A2 | 4/2011 |
| WO | 2011039041 | 4/2011 |
| WO | 2021/009044 A1 | 1/2021 |

OTHER PUBLICATIONS

Website: "Program for making model instructions stored in an LDD (an LXF file)", Blueprint, Apr. 18, 2015 URL: https://www.brickinside.com/newview.php?Db=CAD&Number=1458.
Notice of Preliminary Rejection issued in corresponding Korean patent application No. 10-2019-0043152, 7 pages (English translation only).
Notice of Final Rejection issued in corresponding Korean patent application No. 10-2019-0043152, 5 pages (English translation only).
International Search Report issued in corresponding international patent application No. PCT/EP2020/060353, mailed Jul. 27, 2020, 3 pages.
Written Opinion of the International Searching Authority issued in corresponding international patent application No. PCT/EP2020/060353, mailed Jul. 27, 2020, 6 pages.
First Preliminary Rejection received in corresponding Korean patent application No. 10-2019-0043153, 3 pages (English translation only).
International Search Report issued in corresponding international patent application No. PCT/EP2020/060354, mailed May 13, 2020, 2 pages.
Lee, Seung-Mok et al., "Split-and-Merge-Based Genetic Algorithm (SM-GA) for LEGO Brick Sculpture Optimization", IEEE Access, vol. 6 (Aug. 15, 2018) pp. 40429-40438, 10 pages.
Luo, Sheng-Jie et al., "Legolization—Optimizing LEGO Designs", ACM Transactions on Graphics, vol. 34, No. 6, Article 22, Nov. 2015, 12 pages.
Second Preliminary Rejection received in corresponding Korean patent application No. 10-2019-0043153, 5 pages (English translation only).
Written Opinion of the International Searching Authority issued in corresponding international patent application No. PCT/EP2020/060354, mailed May 13, 2020, 5 pages.
Hakura, Ziyad S., Snyder, John M., "Realistic Reflections and Refractions on Graphics Hardware With Hybrid Rendering and Layered Environment Maps", 2001, Eurographics, EGSR 2001: Rendering Techniques 2001, pp. 289-300.
International Search Report issued in corresponding International Patent Application No. PCT/EP2020/069549, mailed Dec. 10, 2020, 3 pages.
Written Opinion issued in corresponding International Patent Application No. PCT/EP2020/069549, mailed Dec. 10, 2020, 6 pages.
Notice of Final Rejection issued in Korean Patent Application No. 10-2019-0085396, mailed Sep. 30, 2021, 10 pages (English translation only).
Notice of Preliminary Rejection issued in Korean Patent Application No. 10-2019-0085396, mailed Oct. 28, 2020, 14 pages (with English translation only).
CN First Office Action corresponding to Application No. 2020800416858, dated Oct. 31, 2024, 18 pages (with English translation).
CN Search Report corresponding to Application No. 2020800416858, dated Oct. 30, 2024, 2 pages.
Hanisch, Elian, "RCS Build Aid Plugin", GitHub Repository, commit afc5f33, available at https://github.com/m4v/RCSBuildAid/tree/acf5feef71ad883fe033dd5a4654309ea93c925b, 2018, 15 pages.
Linuxgurugamer, "RCS Build Aid Continued—New Dependencies", Kerbal Space Program Forums, available at https://forum.kerbalspaceprogram.com/topic/166546-19x-rcs-build-aid-continued-new-dependencies, 2018, 3 pages.
De Greve, Bram, "Reflections and Refractions in Ray Tracing", retrieved from https://graphics.stanford.edu/courses/cs148-10-summer/docs/2006-degreve-reflection_refraction.pdf, Nov. 13, 2006, 6 pages.
CN First Office Action with Search Report corresponding to Application No. 2020800505692, dated Jan. 17, 2025, 11 pages (OA translation).
CN First Office Action with Search Report corresponding to Application No. 2020800430751, dated Dec. 25, 2024, 6 pages (translation).

* cited by examiner

FIG. 12
| Type | Shape | Weight value |
|---|---|---|
| 1x1 brick |  | 1 |
| 1x2 brick |  | 2.1 |
| 2x2 brick |  | 4.4 |
| 4x4 brick | 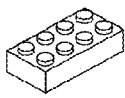 | 8.9 |
| Axle |  | 1.5 |
| Pin connector |  | 0.7 |
| Man |  | 2.5 |

FIG. 13
| Name | Shape | Coupling power value |
|---|---|---|
| Stud 1x1 |  | 1 |
| Stud 1x2 |  | 2.1 |
| Stud 2x2 |  | 4.4 |
| Stud 1x4 |  | 8.9 |
| Stud 2x4 | 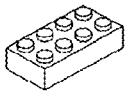 | 1.5 |
| Stud 1x6 | 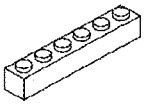 | 0.7 |

FIG. 14
| Name | Shape | Coupling power value |
|---|---|---|
| Stud |  | 1 |
| Axle |  | 2.5 |
| Technic pin |  | 2 |
| Ball |  | 1.5 |
| Hinge | 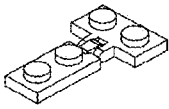 | 0.3 |
| Hand |  | 0.2 |

FIG. 18
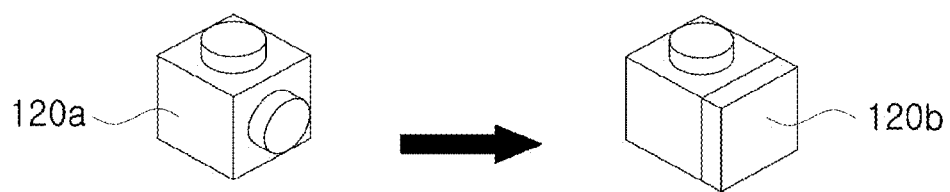
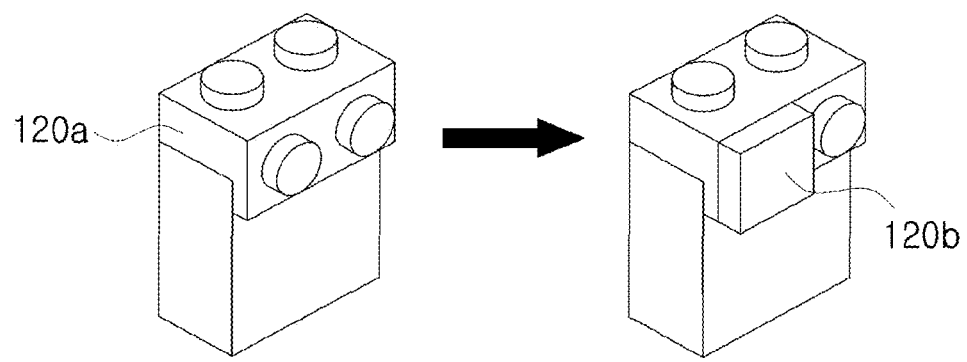

FIG. 24
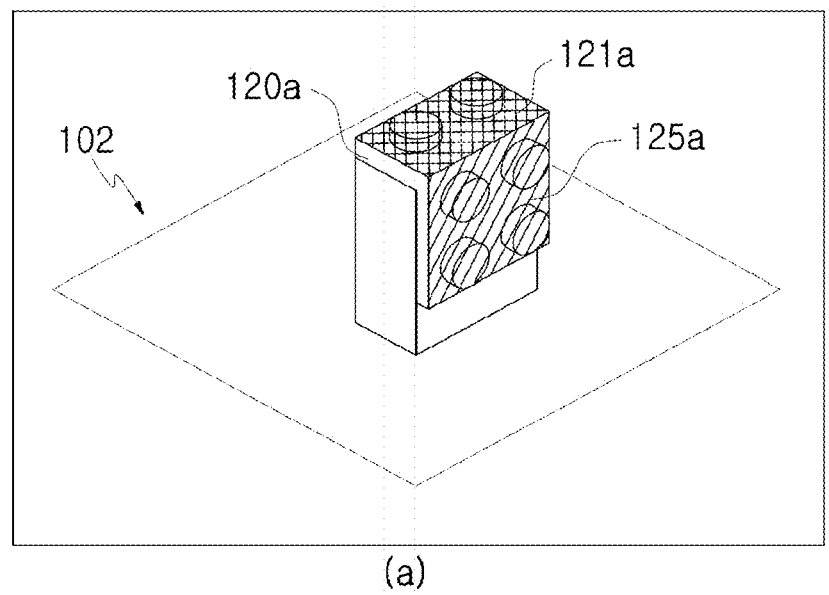
(a)
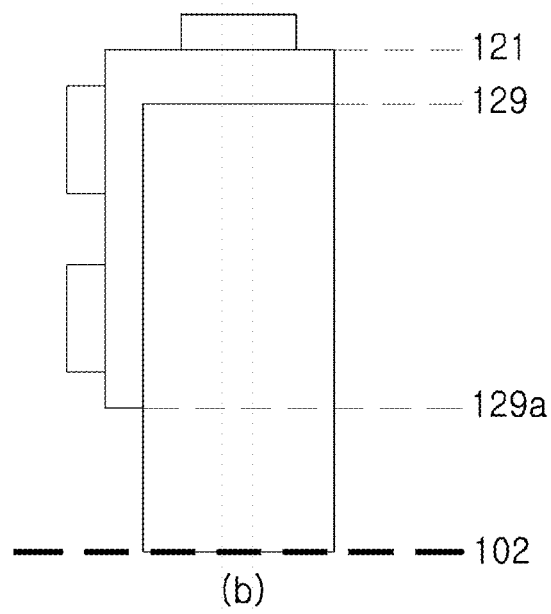
(b)

120-1

METHOD FOR DETERMINING ASSEMBLY SEQUENCE AND GENERATING INSTRUCTION OF ASSEMBLING TOY

CROSS-REFERENCE TO RELATED APPLICATIONS

This application is a U.S. national stage application under 35 U.S.C. 371 of co-pending International Application No. PCT/EP2020/060353 filed on Apr. 10, 2020, which in turn claims priority to KR Patent Application No. 10-2019-0043152 filed on Apr. 12, 2019, the contents of which are incorporated by reference herein in their entirety for any purpose whatsoever.

TECHNICAL FIELD

The present disclosure relates to a method for determining an assembly sequence and generating an instruction of an assembling toy and, more specifically, a method for providing information relating to an assembly sequence of assembling elements used for assembling an assembling toy.

BACKGROUND ART

Assembling toys such as LEGO bricks have been beloved as playthings for decades. Assembling toys having various shapes can be made by assembling various assembling elements, which have been standardized and have high interchangeability, and thus assembling toys are very popular not only with young children but also with adults.

Recently, assembling toy users are increasingly demanding to develop their own designs beyond conventionally assembling a toy in a shape predetermined by an assembling toy seller. In relation to this, in order to minimize trial and error and inconvenience occurring with directly assembling an assembling toy in an actual space, programs that enable a user to virtually assemble assembling elements are being developed.

DISCLOSURE OF THE INVENTION

Technical Tasks to be Solved by the Invention

A task of the present invention is to provide a method for determining an assembly sequence of assembling elements.

A further task of the present invention is to automatically determine an assembly sequence of an assembling toy and provide the assembly sequence so as to increase a user's convenience.

Another task of the present invention is to provide an instruction showing an assembly sequence of an assembling toy.

Tasks to be achieved through the present invention are not limited to the aforementioned tasks, and other tasks that have not been mentioned may be clearly understood by those of ordinary skill in the art from the present disclosure and the accompanying drawings.

Technical Solution

An aspect of the present disclosure may provide a method for determining an assembly sequence of an assembling toy including a plurality of assembling elements disposed in a virtual space, each of the assembling elements having at least one coupling part complementarily coupled to another coupling part, being connected to another assembling element through the coupling part, and including a previously assembled element that has been assembled to the assembling toy in the virtual space and a target assembling element that has not been assembled yet. The method includes: determining an assembly group in consideration of an upper surface height of the target assembling element connected to the previously assembled element, wherein the upper surface height is calculated on the basis of a height from a ground to an upper surface of the target assembling element; and determining whether to generate a sub assembly group in consideration of the number of the assembling elements included in the assembly group.

A further aspect of the present disclosure may provide a method for determining an assembly sequence of an assembling toy including a plurality of assembling elements disposed in a virtual space, each of the assembling elements having at least one coupling part complementarily coupled to another coupling part, being connected to another assembling element through the coupling part, and including a previously assembled element that has been assembled to the assembling toy in the virtual space and a target assembling element that has not been assembled yet. The method includes determining an assembly group from the target assembling element in consideration of a connection relationship with the previously assembled element, wherein the determining the assembly group includes considering at least one connection between a connection to an upper portion of the previously assembled element and a connection to a lower portion of the previously assembled element.

Another aspect of the present disclosure may provide a method for determining an assembly sequence of an assembling toy including a plurality of assembling elements disposed in a virtual space, each of the assembling elements having at least one coupling part complementarily coupled to another coupling part and being connected to another assembling element through the coupling part. The method includes: determining a first assembly group including at least one assembling element having a smallest upper surface height among the assembling elements contacting a ground; and determining a second assembly group in consideration of at least one of an upper surface height of the assembling element connected to an upper portion of the assembling element included in the first assembly group and an upper surface height of the assembling element that contacts the ground and is not included in the first assembly group.

Solutions of the present disclosure are not limited to the above described solutions, and other solutions that have not been mentioned may be clearly understood by those of ordinary skill in the art from the present disclosure and the accompanying drawings.

Advantageous Effects

According to the present disclosure, an assembly sequence of assembling elements can be determined in consideration of a connection relationship with previously assembled assembling elements.

Further, according to the present disclosure, an assembly sequence of an assembling toy can be automatically determined to increase a user's convenience.

Further, according to the present disclosure, an instruction providing an assembly sequence of an assembling toy can be generated.

Effects of the present disclosure are not limited to the above described effects, and other effects that have not been mentioned may be clearly understood by those of ordinary skill in the art from the present disclosure and the accompanying drawings.

BRIEF DESCRIPTION OF DRAWINGS

FIG. 12 is a diagram relating to weight values of assembling elements according to an embodiment.

FIGS. 13 and 14 are diagrams relating to coupling power values between coupling parts according to an embodiment.

FIGS. 17 to 19 are diagrams relating to a connection direction of assembling elements according to an embodiment.

FIG. 24 is a diagram relating to a determination of a height of an assembling element according to an embodiment.

MODES FOR CARRYING OUT THE INVENTION

Figure 1:
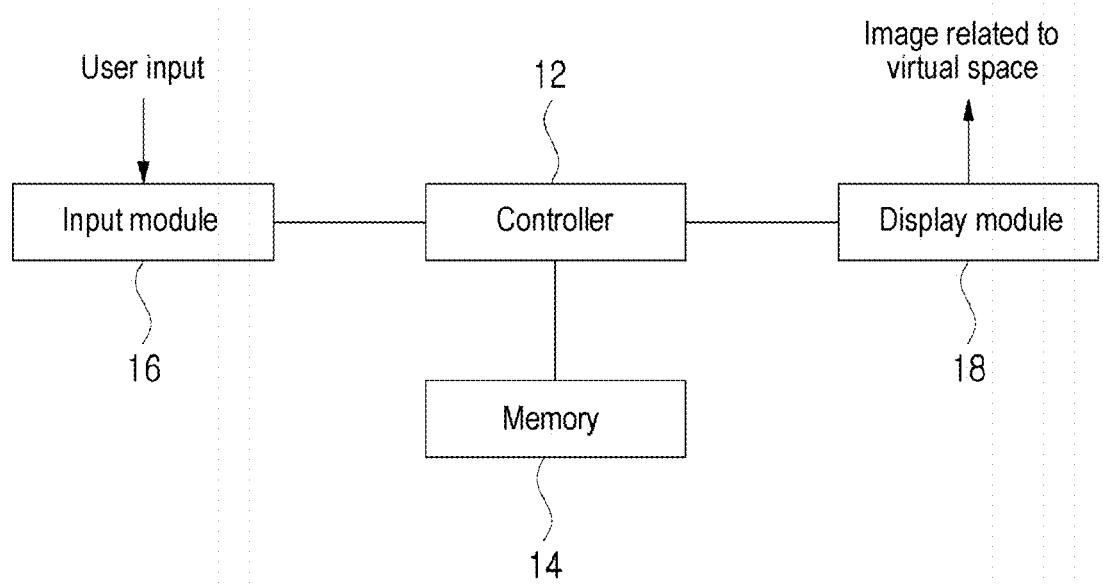
FIG. 1 is a diagram relating to a system that processes a virtual space according to an embodiment.

Embodiments described in the present disclosure have been made to clearly explain the concept of the present disclosure to those having ordinary skill in the art, and thus the present disclosure is not limited to the embodiments described in the present disclosure. The scope of the present disclosure should be interpreted as including variations and modifications within the concept of the present disclosure.

The terms used in the present disclosure are selected from general terms, which are currently widely used, on the basis of functions in the present disclosure, and may vary according to the intentions of those of ordinary skill in the art, the custom in the field of art, or the advance of new technology. When a specific term is defined and used with an arbitrary meaning, the meaning of the term will be described separately. Accordingly, the terms used in the present disclosure should be interpreted on the basis of the real meanings of the terms and the entire description of the present disclosure, rather than the simple names of such terms.

The accompanying drawings in the present disclosure are to facilitate the explanation of the present disclosure. The shape illustrated in the drawings may be exaggerated for the purpose of convenience of explanation, so the present disclosure is not limited to the drawings.

In the present disclosure, a detailed description of related known functions or configurations incorporated herein will be omitted as necessary when it may make the subject matter of the disclosure rather unclear.

An aspect of the present disclosure may provide a method for determining an assembly sequence of an assembling toy including a plurality of assembling elements disposed in a virtual space, each of the assembling elements having at least one coupling part complementarily coupled to another coupling part, being connected to another assembling element through the coupling part, and including a previously assembled element that has been assembled to the assembling toy in the virtual space and a target assembling element that has not been assembled yet. The method includes: determining an assembly group in consideration of an upper surface height of the target assembling element connected to the previously assembled element, wherein the upper surface height is calculated on the basis of a height from a ground to an upper surface of the target assembling element; and determining whether to generate a sub assembly group in consideration of the number of the assembling elements included in the assembly group.

The determining the assembly group may include determining the assembly group in further consideration of an upper surface height of the target assembling element contacting the ground.

The determining the assembly group may include determining the assembly group to include at least one target assembling element having a smallest upper surface height among the target assembling element connected to the previously assembled element and the target assembling element contacting the ground.

The determining whether to generate the sub assembly group may include generating the sub assembly group if the number of the assembling elements included in the assembly group exceeds a predetermined value.

The assembly sequence determining method may further include outputting an instruction of the assembling toy on the basis of the assembly group.

A further aspect of the present disclosure may provide a method for determining an assembly sequence of an assembling toy including a plurality of assembling elements disposed in a virtual space, each of the assembling elements having at least one coupling part complementarily coupled to another coupling part, being connected to another assembling element through the coupling part, and including a previously assembled element that has been assembled to the assembling toy in the virtual space and a target assembling element that has not been assembled yet. The method includes determining an assembly group from the target assembling element in consideration of a connection relationship with the previously assembled element, wherein the determining the assembly group includes considering at least one connection between a connection to an upper portion of the previously assembled element and a connection to a lower portion of the previously assembled element.

If the determining the assembly group includes considering the connection to the upper portion of the previously assembled element, the determining the assembly group may include determining the assembly group in consideration of at least one of an upper surface height of the target assembling element connected to the upper portion of the previously assembled element and an upper surface height of the target assembling element contacting a ground.

The determining the assembly group may include determining the assembly group to include at least one target assembling element having a smallest upper surface height among the target assembling element connected to the upper portion of the previously assembled element and the target assembling element contacting the ground.

If the determining the assembly group includes considering the connection to the lower portion of the previously assembled element, the determining the assembly group may further include determining a sub-assembly in consideration of a root element that is a target assembling element connected to the lower portion of the previously assembled element.

The sub-assembly may include the root element and the target assembling element connected to the root element.

The assembly sequence determining method may further include determining whether to generate a sub assembly group in consideration of the number of the assembling elements included in the assembly group.

The determining whether to generate the sub assembly group may include generating the sub assembly group if the number of the assembling elements included in the assembly group exceeds a predetermined value.

The assembly sequence determining method may further include outputting an instruction of the assembling toy on the basis of the assembly group.

The assembly sequence determining method may further include changing a predetermined assembly sequence by a user.

Another aspect of the present disclosure may provide a method for determining an assembly sequence of an assembling toy including a plurality of assembling elements disposed in a virtual space, each of the assembling elements having at least one coupling part complementarily coupled to another coupling part and being connected to another assembling element through the coupling part. The method includes: determining a first assembly group including at least one assembling element having a smallest upper surface height among assembling elements contacting a ground; and determining a second assembly group in consideration of at least one of an upper surface height of an assembling element connected to an upper portion of the assembling element included in the first assembly group, and an upper surface height of an assembling element that contacts the ground and is not included in the first assembly group.

The determining the second assembly group may include determining the second assembly group to include at least one assembling element having a smallest upper surface height among the assembling element connected to the upper portion of the assembling element included in the first assembly group and the assembling element that contacts the ground and is not included in the first assembly group.

The present disclosure discloses a device, a method, and a computer program product for providing various information that is useful for making an assembling toy by virtually connecting an assembling element, or assembling an assembling toy in an actual space.

The above features described in the present disclosure may be carried out in a virtual space in which an assembling toy or an assembling element is virtually implemented. For example, the present disclosure may provide a virtual space in which a user can dispose virtual assembling elements obtained through replication of actual assembling elements or make an assembling toy having a desired design beforehand by connecting the virtual assembling elements.

Further, the present disclosure may provide: a feature of rendering an assembling toy made in a virtual space to have an actual shape, so as to enable a user to check beforehand the figure of the assembling toy assembled in an actual space; a feature of checking, in a virtual space, stability of an assembling toy or assembling elements constituting the same so as to enable a user to check beforehand whether the balance of the assembling toy made in a virtual space is actually right, or whether the strength of each portion is sufficient; or a feature of generating an instruction for assembling an assembling toy made in a virtual space in an actual space.

Hereinafter, terms used in the present disclosure will be defined.

As described above, "virtual space" may mean a space in which an action, performed in an actual space, of making an assembling toy or connecting assembling elements can be performed virtually. Such a virtual space may be implemented through a computer or similar equipment, and may be presented to a user as an image through a visual interface such as a display.

An assembling element may be located in the virtual space. In addition, assembling elements located in the virtual space may be connected to each other in the virtual space. By using the above-described virtual space, a user may assemble beforehand an assembling toy having a desired design while reducing trial and error or difficulty that occurs when assembling elements are handled directly in an actual space.

The virtual space may be provided as a three-dimensional space and have three-dimensional coordinates accordingly. Therefore, in the virtual space, an assembling element may be disposed at a particular location indicated by three-dimensional coordinates. Accordingly, location data of the assembling element indicating a location of the assembling element in the virtual space may be provided. Further, the assembling element may have a particular posture in the virtual space. Accordingly, posture data of the assembling element indicating the posture of the assembling element in the virtual space may be provided.

In addition, in the virtual space, a virtual ground may be provided. Assembling elements can be disposed on the virtual ground. In addition, the virtual ground may be a criterion for determining the balance of an assembling toy described later.

Hereinafter, the term "assembling toy" is used for both a physical assembling toy existing in an actual space and a virtual assembling toy existing in the virtual space. However, hereinafter, in order to distinguish between the two terms, "an assembling toy existing in a virtual space" is referred to as "an assembling toy", and "an assembling toy existing in an actual space" is referred to as "a physical assembling toy", except for the case where the terms are clearly distinguished from each other in context. Similarly, in order to distinguish between an assembling element in a virtual space and an assembling element in an actual space, "an assembling element existing in a virtual space" is referred to as "an assembling element", and "an assembling element existing in an actual space" is referred to as "a physical assembling element", except for the case where the terms are clearly distinguished from each other in context.

FIG. 1 is a diagram relating to a system 10 that processes a virtual space according to an embodiment of the present disclosure.

Referring to FIG. 1, the system 10 may include a controller 12, a memory 14, an input module 16, and a display module 18.

The controller 12 may perform processing and calculation of various information and control other elements included in the system 10. The controller 12 may be physically provided as a type of an electronic circuit configured to process electrical signals. The system 10 may physically include only a single controller 12, but may include a plurality of controllers 12. For example, the controller 12 may be one or a plurality of processors mounted in a personal computer. As another example, the controller 12 may be provided as processors which are mounted in a server and a terminal physically spaced apart from each other and cooperate with each other through communication.

The controller 12 may perform various steps and operations for stability determination relating to the balance of an assembling toy or the connection power of an assembling element, and generation of an instruction, which are described below, as well as implementation of a virtual space, and disposition or connection of assembling elements in a virtual space, which are described above. In addition, an operation of receiving a user input through the input module 16, an operation of outputting an image through the display module 18, and an operation of storing various data in the memory 14 or obtaining various data from the memory 14 may be performed under the control of the controller 12. Hereinafter, various operations or steps disclosed through an embodiment of the present disclosure may be interpreted to be performed by the controller 12 unless stated separately.

The input module 16 may receive a user input from a user. The display module 18 may provide visual information to the user. For example, the display module 18 may display a virtual space, display assembling elements and an assembling toy disposed in the virtual space, or display various GUIs for processing assembling elements in the virtual space. The input module 16 may be provided as various types, for example, a mouse, a keyboard, and a digitizer, and should be interpreted as a concept encompassing any type of devices capable of receiving an input from a user. The display module 18 may be provided as various types, for example, a monitor, a TV, and an HMD, and should be interpreted as a concept encompassing any type of devices capable of providing visual information to a user.

Various information may be provided in the memory 14. For example, location data indicating the coordinate of an assembling element disposed in a virtual space, or posture data indicating the posture of an assembling element disposed in a virtual space may be stored in the memory 14. As another example, information indicating the coupling power of a coupling part, used for determining stability described below may be stored in the memory 14. Pieces of information stored in the memory 14 may be used to allow the controller 12 to perform various operations. In the present disclosure, the memory 14 may be interpreted as a comprehensive concept including both a volatile memory such as a RAM and a nonvolatile memory such as a hard disk or flash disk.

Figure 2:
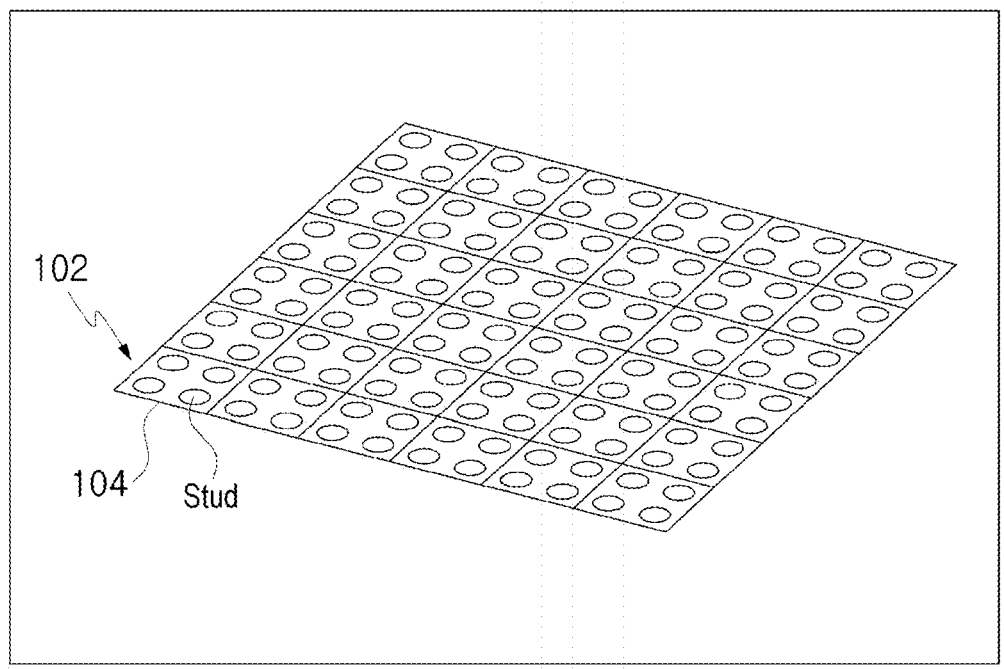
FIG. 2 is a diagram illustrating a virtual space according to an embodiment.

FIG. 2 is a diagram illustrating a virtual space 100 according to an embodiment of the present disclosure.

Referring to FIG. 2, the virtual space 100 may be provided as a three-dimensional space. The virtual space 100 may include a ground 102. The ground may serve as a floor on which an assembling element may be disposed. However, the ground 102 is not necessarily required to be included in the virtual space 100.

FIG. 2 illustrates the ground 102 in which a cell 104 having studs arranged in a 2×2 format is arranged in two dimensions, but the shape of the ground 102 is not limited to the shape illustrated in FIG. 2.

Figure 3:
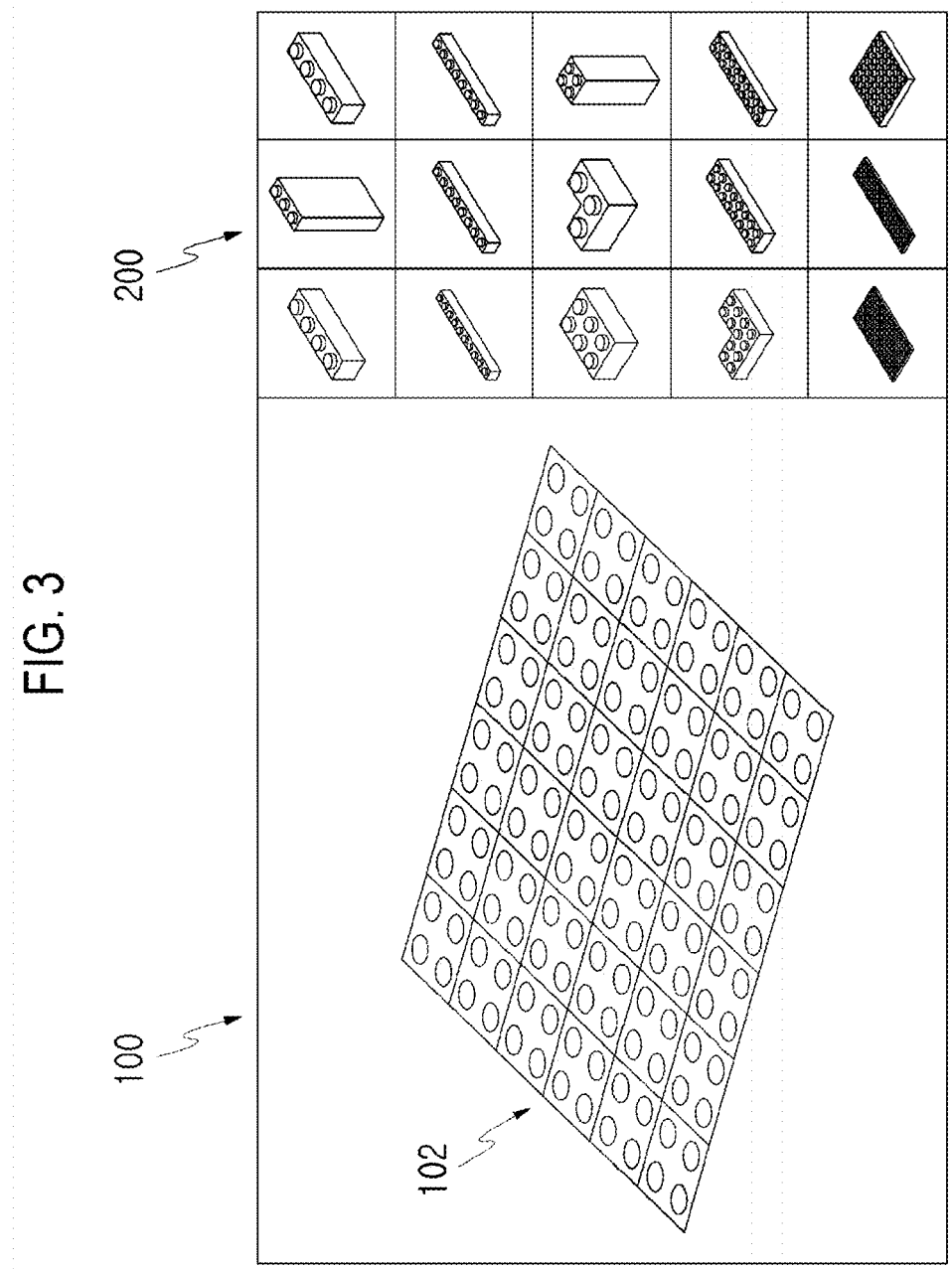
FIG. 3 is a diagram illustrating an assembling element palette according to an embodiment.

FIG. 3 is a diagram illustrating an assembling element palette 200 according to an embodiment of the present disclosure.

The system 10 may provide, together with the virtual space 100, the assembling element palette 200 as a GUI for selecting an assembling element to be disposed in the virtual space. The assembling element palette 200 may include types and shapes of assembling elements. The system 10 may receive an input selecting an assembling element from a user through the input module 16, to determine an assembling element to be disposed in the virtual space.

In addition, assembling elements displayed on the assembling element palette 200 may be determined according to assembling element categories classifying the assembling elements. The system 10 may receive an input selecting an assembling element category from a user, to determine the type of an assembling element to be displayed on the assembling element palette 200.

In addition, the system 10 may process various operations for an assembling element in the virtual space 100.

Figure 4:
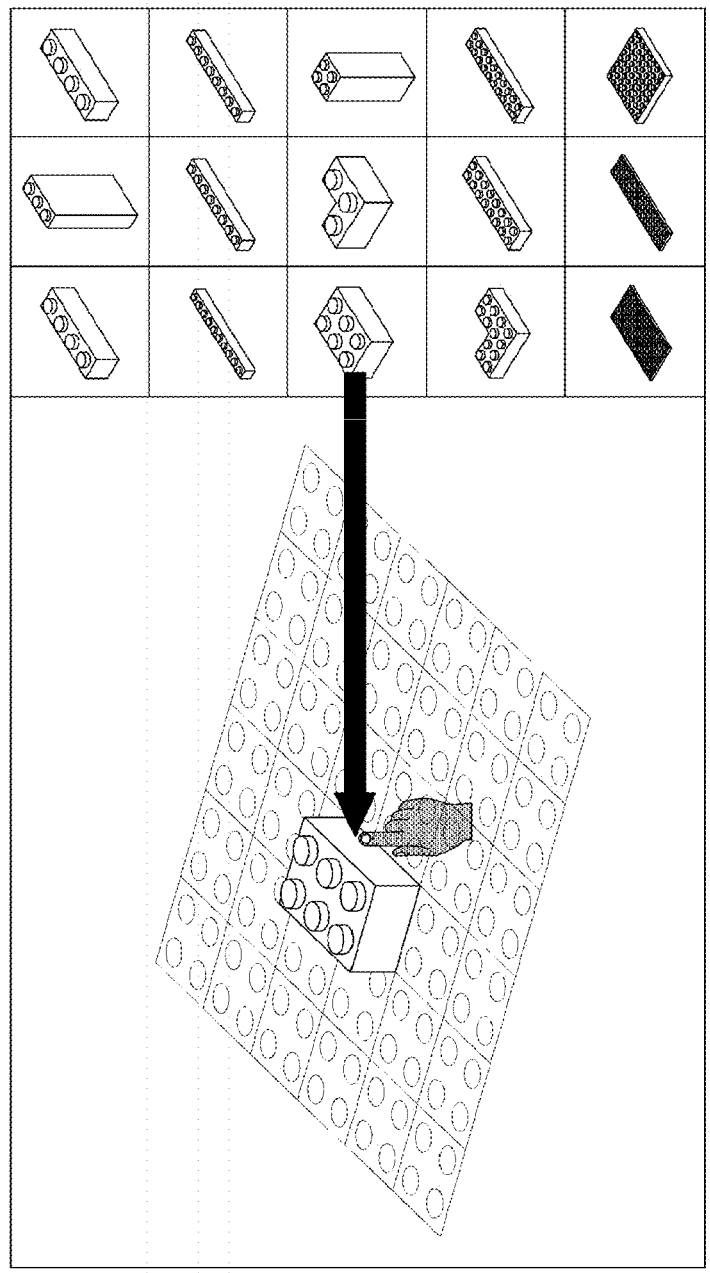
FIG. 4 is a diagram that illustrates disposing an assembling element in a virtual space according to an embodiment.
Figure 5:
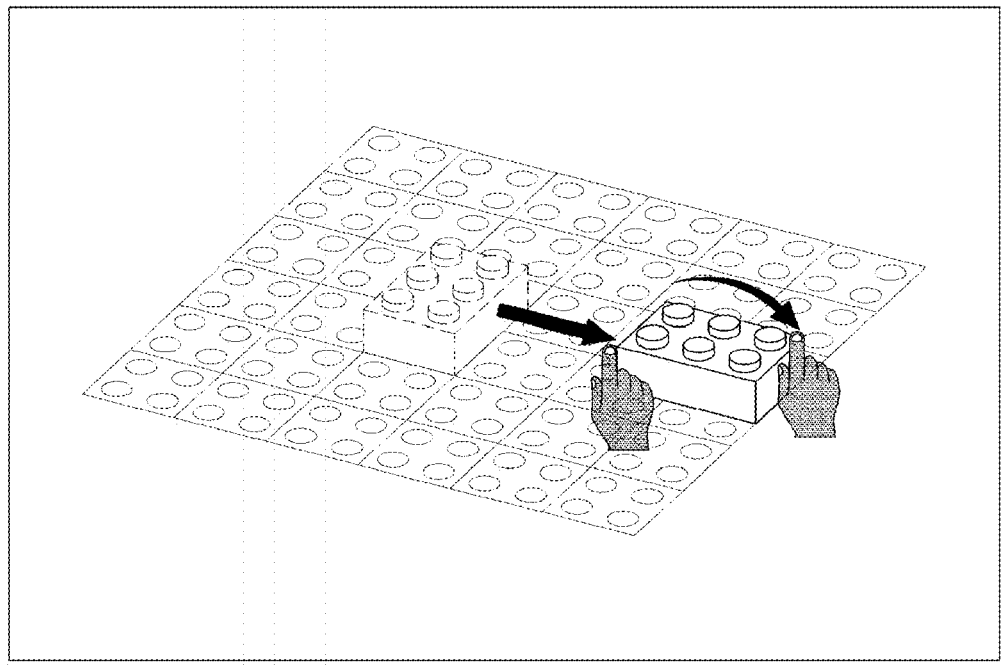
FIG. 5 is a diagram that illustrates moving an assembling element or adjusting the posture of the assembling element in a virtual space according to an embodiment.
Figure 6:
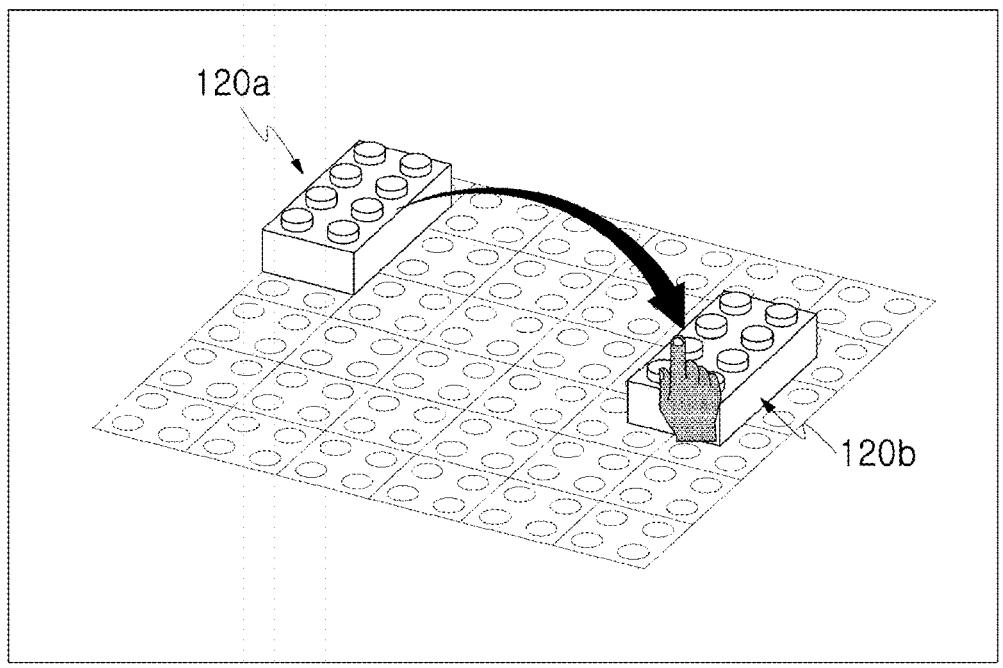
FIGS. 6 and 7 are diagrams that illustrate connecting assembling elements in a virtual space according to an embodiment.
Figure 7:
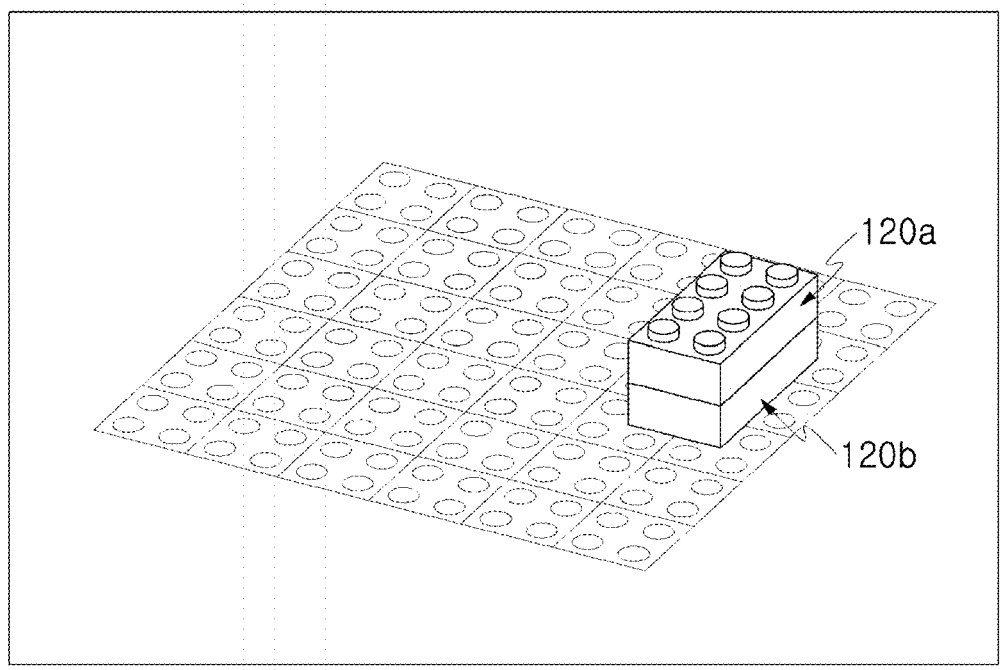

FIG. 4 is a diagram that illustrates disposing an assembling element in a virtual space according to an embodiment of the present disclosure. FIG. 5 is a diagram that illustrates moving an assembling element or adjusting the posture of the assembling element in a virtual space according to an embodiment of the present disclosure. FIGS. 6 and 7 are diagrams that illustrate connecting an assembling element in a virtual space according to an embodiment of the present disclosure.

Referring to FIG. 4, an assembling element may be disposed in a virtual space. The system 10 may dispose a selected assembling element at a particular location in the virtual space according to a user input. For example, the system 10 may receive a user input selecting a particular location in the virtual space and dispose an assembling element at the location. As illustrated in FIG. 4, disposing of an assembling element in the virtual space may be performed according to a user input of dragging and dropping, from an assembling element palette, the assembling element at a location at which the assembling element is to be disposed in the virtual space.

Referring to FIG. 5, the location or the posture of an assembling element disposed in a virtual space may be adjusted. The system 10 may move an assembling element predisposed in the virtual space, to another location in the virtual space according to a user input. For example, the system 10 may receive a user input selecting an assembling element disposed in the virtual space, and according to a user input indicating a movement location of the selected assembling element, the system may change the location of the assembling element in the virtual space. As another example, the system 10 may receive a user input selecting an assembling element disposed in the virtual space, and according to a user input indicating a posture of the selected assembling element, the system may change the posture of the assembling element in the virtual space.

Referring to FIGS. 6 and 7, assembling elements may be connected to each other in a virtual space. The system 10 may connect an assembling element disposed in the virtual space and another assembling element disposed in the virtual space according to a user input. For example, the system 10 may receive a user input selecting an assembling element disposed in the virtual space, and according to a user input indicating a connection between the selected assembling element and another assembling element, the system may connect the assembling elements in the virtual space. In a more detailed example, as illustrated in FIG. 6, when a drag-and-drop type of user input that moves a first assembling element 120a in the virtual space to a location at which the first assembling element is connected to a second assembling element 120b is received, the system 10 may connect the second assembling element 120b and the first assembling element 120a as illustrated in FIG. 7.

Hereinafter, an assembling toy and an assembling element will be described.

Figure 8:
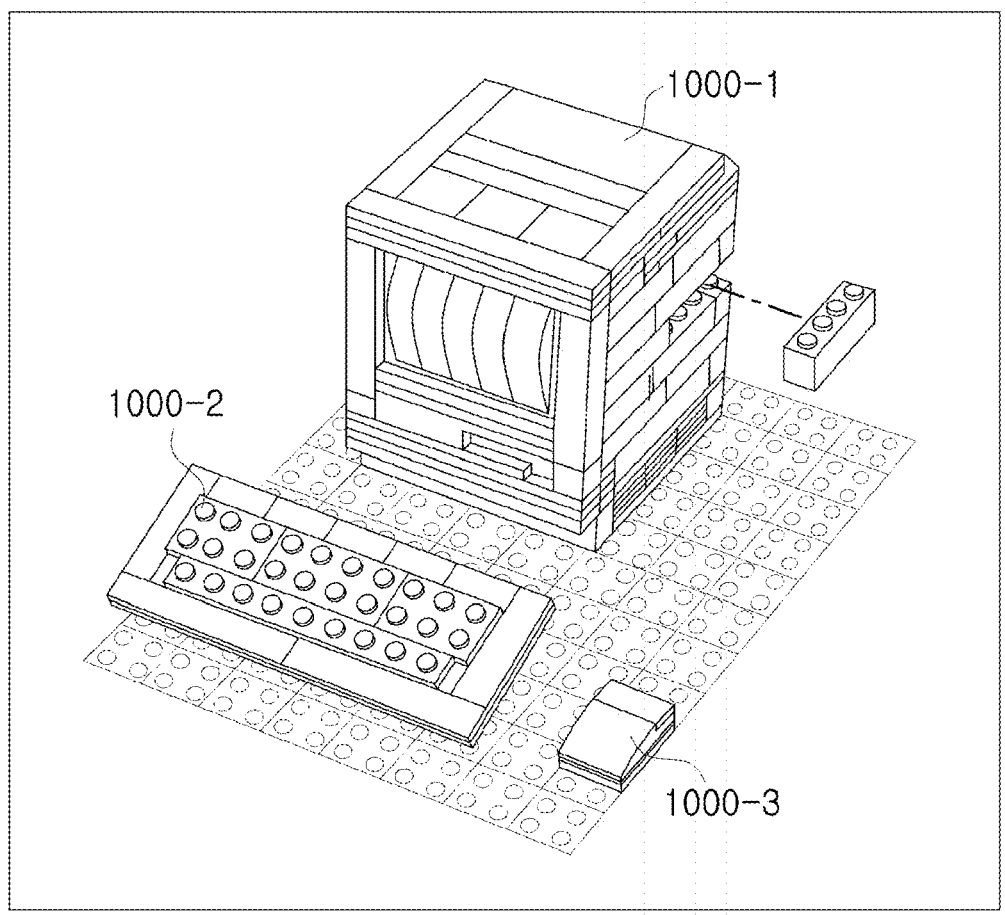
FIG. 8 is a diagram relating to assembling elements and an assembling toy according to an embodiment.

FIG. 8 is a diagram relating to an assembling element and an assembling toy according to an embodiment of the present disclosure.

In an actual space, physical assembling elements may be connected to each other to complete a physical assembling toy. An assembling element may be provided to replicate, in a virtual space, the behavior of a physical assembling element in an actual space, and assembling elements may be connected to each other in the virtual space to be assembled to an assembling toy accordingly. The assembling toy described above may mean the entirety of an assembly including all the connected assembling elements. Therefore, if assembling elements existing in a virtual space are not connected to each other, each of the assembling elements configures different assembling toys. That is, in a virtual space, a plurality of assembling toys may exist. Assembling elements connected through a ground or a plate may be determined to be disconnected from each other, or may be determined to be connected to each other. For example, as illustrated in FIG. 8, if assembling elements are assembled in a personal computer type, a first assembling toy 1000-1 having a PC shape, a second assembling toy 1000-2 having a keyboard shape, and a third assembling toy 1000-3 having a mouse shape may be determined to exist in a virtual space. As another example, all the assembling elements illustrated in FIG. 8 may be determined to form a single assembling toy. In FIG. 8, if assembling elements are assumed to be disposed on a plate-like assembling element rather than a virtual ground, all the assembling elements may be connected to each other through the plate-like assembling element, and thus may be determined to be a single assembling toy. In FIG. 8, if assembling elements are assumed to be disposed on a plate-like assembling element rather than a virtual ground, a connection by plate-like assembling elements is determined not to correspond to a connection between assembling elements, which is considered as a classification of an assembling toy, and thus a plurality of assembling toys may be determined to be in a virtual space.

Hereinafter, an assembling element will be described in more detail.

An assembling element may mean a unit constituting an assembling toy. An assembling element may be connected to another assembling element. In addition, an assembling element may be provided in various types.

Figure 9:
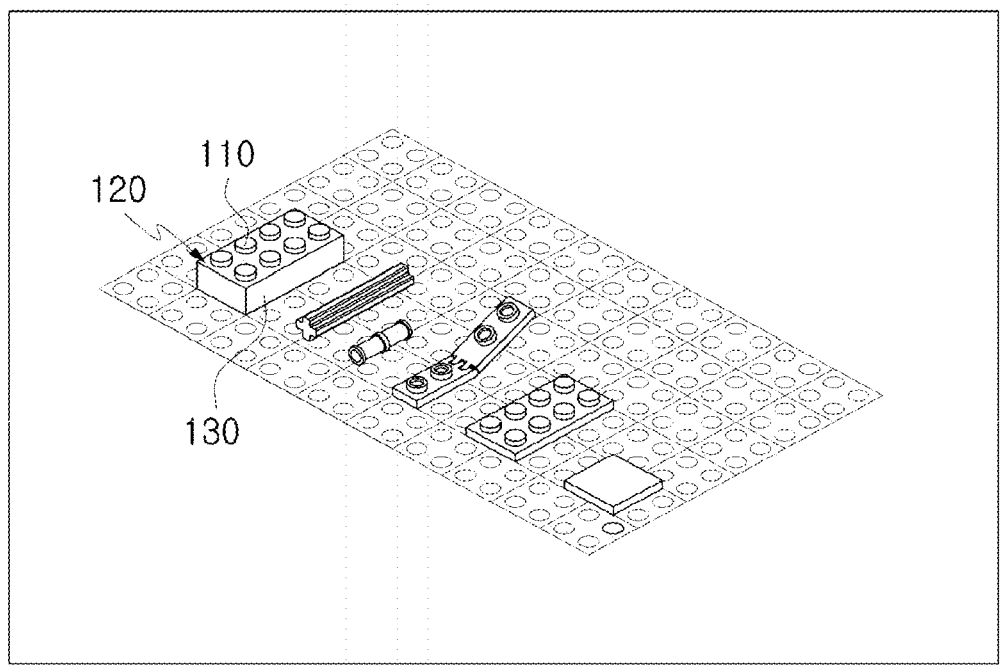
FIG. 9 is a diagram illustrating various types of assembling elements according to an embodiment.

FIG. 9 is a diagram illustrating various types of assembling elements according to an embodiment of the present disclosure.

Referring to FIG. 9, an assembling element 120 may have various types. The types of the assembling element 120 may include, for example, a brick type having a hexahedral shape, an axle type extending lengthwise with a cross section having a shape of a cross, a pin connector type including a pin, a hinge type in which two plates are connected by a hinge structure and the angle therebetween is adjusted, a plate type having a flat shape and a stud, and a tile type having a flat shape and lacking a stud. Further, the types of the assembling element 120 may include many other types in addition to the above mentioned examples according to the entire shape, size, and the type of a coupling part 110.

Each of assembling elements 120 may include a body 130 and a coupling part 110. A body 130 corresponds to a part forming the exterior of an assembling element 120, and a coupling part 110 corresponds to a portion functioning to connect the assembling element 120 to another assembling element 120. For example, a brick type assembling element 120 illustrated in FIG. 9 has a hexahedral body 130 and eight studs as a coupling part 110 formed on the body 130. A coupling part 110 of an assembling element 120 is a term defined functionally, and thus is not always required to be physically distinguished from the body 130. For example, a coupling part 110 may be integrally formed with a body 130 like a coupling part 110 of an axle type assembling element 120 illustrated in FIG. 9.

A coupling part 110 may be coupled to another coupling part 110. Assembling elements 120 may be connected to each other through the coupling of the coupling parts 110. A connection of assembling elements 120 may mean that coupling parts 110 of the assembling elements 120 are coupled to each other, whereby the two assembling elements 120 are fixed to each other. Therefore, two assembling elements 120 simply being in contact with each other without the coupling between coupling parts 110 may be considered to be disconnected from each other.

For example, a coupling part 110 may be coupled to another coupling part 110 having a shape complementary to the coupling part.

Figure 10:
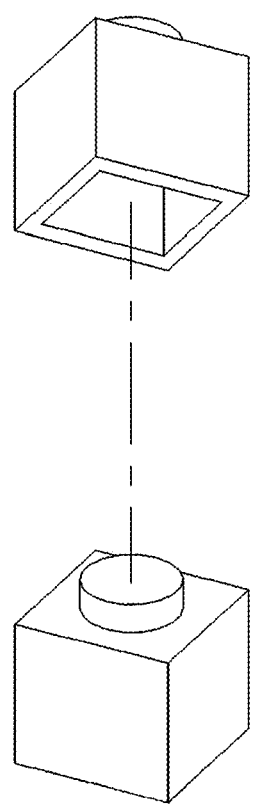
FIGS. 10 and 11 are diagrams illustrating examples of coupling of coupling parts according to an embodiment.
Figure 11:
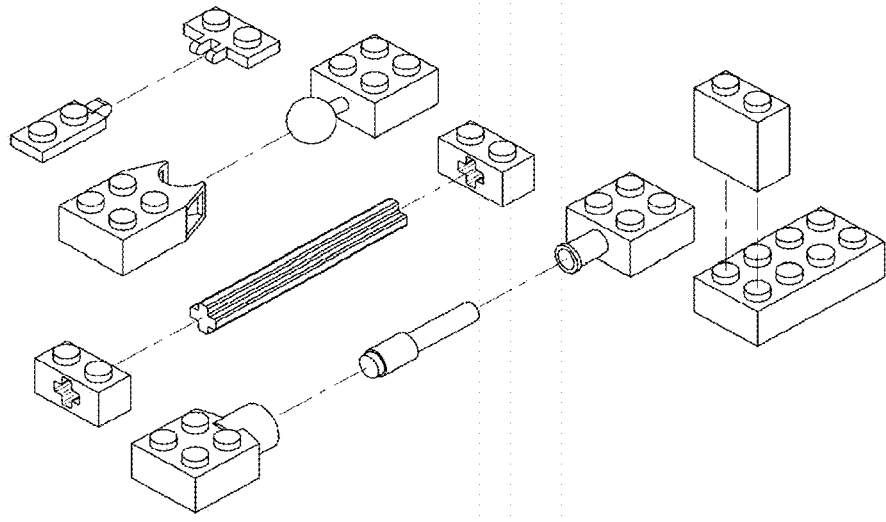

FIGS. 10 and 11 are diagrams illustrating examples of coupling of coupling parts according to an embodiment of the present disclosure. For example, as illustrated in FIG. 10, a stud type coupling part is inserted by press-fitting to a cavity type coupling part, whereby the two coupling parts may be coupled to each other. That is, in FIG. 10, the two coupling parts may be coupled by a male-female connection between a stud and a cavity.

Further, a coupling part may be various shapes in addition to the shapes illustrated in FIG. 10.

For example, a coupling part may be provided with a stud or cavity having the number and/or arrangement different from those of the 1×1 stud and the 1×1 cavity illustrated in FIG. 10. For example, a coupling part may be provided with 2×2 studs, 1×4 studs, or three studs bent perpendicularly, or cavities complementary to the above studs. That is, a stud type coupling part may have various shapes of grid patterns, and a cavity may also have various shapes complementary to the above stud type coupling part. As another example, a coupling part may be provided as a type of an axle or a groove to which an axle is inserted. There may be a wide variety of other coupling part types as well as the examples illustrated in FIG. 11, and the disclosure is not limited to the examples.

Hereinafter, an operation of checking the stability of an assembling toy according to an embodiment of the present disclosure will be described. As noted from the following description, a stability checking operation can be performed by the above described system.

Checking the stability of an assembling toy is to provide guide information relating to whether the assembling toy assembled in a virtual space can also be stable in an actual space. A target of stability checking may include both an assembling toy in a process of assembling and a finished product completed according to a final design.

According to an example, the system 10 may check whether an assembling toy in a virtual space can be stably supported on a ground. In other words, the system 10 may provide information relating to whether an assembling toy in a virtual space is balanced.

According to another example, the system 10 may check whether each portion of an assembling toy in a virtual space can stably maintain the assembled state. In other words, the system 10 may provide information relating to whether the connection between assembling elements included in an assembling toy in a virtual space is stable, or whether the coupling by coupling parts forming the connection between the assembling elements is stable.

For the above described checking of the stability of an assembling toy, weight information of assembling elements in a virtual space, information relating to a contact surface with a ground, and coupling power information between coupling parts may be used.

Hereinafter, pieces of information used for checking the stability of an assembling toy will be described before the stability checking is described.

First, weight information may be assigned to an assembling element. A weight assigned to an assembling element may be information reflecting the weight of an actual physical assembling element. Such weight information may be stored in the memory.

For example, weight information assigned to an assembling element may be determined by the volume and density of the assembling element. The weight values of several basic type assembling elements are stored in the memory, and on the basis of the stored values, the controller may calculate the weight value of an assembling element, the type of which is derived from an assembling element, the weight value of which is stored. For example, the weight value of a brick type assembling element having a 1×1 stud may be stored in the memory as "1". The controller may calculate the weight value of a brick type assembling element having 1×2 studs by multiplying the weight value of the brick type assembling element having the 1×1 stud by 2 which is a ratio in volume between the two assembling elements.

As another example, the weight values of assembling elements may be individually stored in the memory.

FIG. 12 is a diagram relating to the weight values of assembling elements according to an embodiment of the present disclosure. Referring to FIG. 12, the weight values of assembling elements may be provided in a lookup table type.

The value of weight information assigned to a virtual assembling element is not necessarily required to be identical or proportional to the weight of a physical assembling element, and the value of the weight information may even be approximated for convenience of weight calculation in a virtual space.

Next, coupling power information between coupling parts of assembling elements may be configured. Coupling power information between coupling parts may reflect the power of coupling between coupling parts of actual physical assembling elements. Such coupling power information may be stored in the memory.

For example, coupling power information between coupling parts may be determined by the types and number of the coupling parts. The coupling powers of several basic type coupling parts are stored in the memory, and on the basis of the stored values, the controller may calculate the coupling power between various shapes of coupling parts. For example, the coupling power between a 1×1 stud and a 1×1 cavity may be stored in the memory as "1". The controller may calculate the coupling power between 1×2 studs and 1×2 cavities by multiplying the coupling power value between the 1×1 stud and the 1×1 cavity by 2, which is a ratio of the number of pairs of studs and cavities that are coupled to each other.

As another example, coupling power values between coupling parts may be individually stored in the memory.

FIGS. 13 and 14 are diagrams relating to coupling power values between coupling parts according to an embodiment of the present disclosure. Referring to FIGS. 13 and 14, coupling power values may be provided in a lookup table type.

A coupling power value between coupling parts connecting virtual assembling elements is not necessarily required to be identical or proportional to a physical coupling power value, and may even be approximated for convenience of coupling power calculation in a virtual space.

In FIGS. 13 and 14, the coupling power between coupling parts is illustrated to be determined by one of two coupling powers included in the coupling between the coupling parts. However, the coupling power between coupling parts may not necessarily be determined by one coupling part. For example, the power of the coupling in which a 1×1 stud is involved may be different according to the shape of a cavity coupled to the 1×1 stud, and thus the coupling power between coupling parts may be determined in consideration of both sides of the two coupling parts involved in the coupling.

In addition, in the above, calculation of the coupling power between the coupling parts is described as fixedly determined by the type and number of the coupling parts, but the calculation is not necessarily determined in such a manner.

Figure 15:
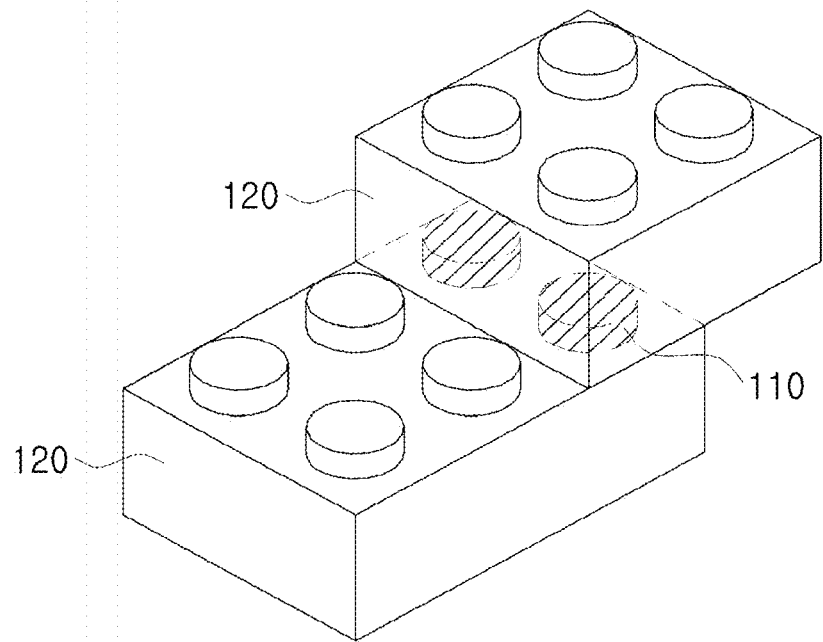
FIG. 15 is a diagram illustrating an example of a coupled state between coupling parts according to an embodiment.

FIG. 15 is a diagram illustrating an example of a coupled state between coupling parts according to an embodiment of the present disclosure. Referring to FIG. 15, the assembling element 120 in an inserted coupling part (male coupling part) side has a 2×3 stud type coupling part 110, and the assembling element 120 in a receiving coupling part (female coupling part) side has a 2×2 stud type coupling part 110. However, the type of the coupling between the coupling parts 110 corresponds to a 1×2 stud type. Therefore, the coupling power between the two coupling parts 110 illustrated in FIG. 15 may be determined as the coupling power of the 1×2 stud type. In other words, to be more precise, the coupling power between coupling parts 110 is determined by a coupling type rather than the coupling parts 110 involved in the coupling. As apparent from the following description, the coupling between coupling parts 110 may be expressed to be the coupling of coupling parts 110 in the case where the term is clear in the context, for convenience of explanation in the present disclosure.

Therefore, the coupling power between coupling parts 110 may be stored in the memory according to types in which the coupling parts 110 may be coupled to each other, or the controller may calculate a coupling power value relating to a derived type on the basis of a coupling power value (e.g. a coupling power value of a 1×1 stud) of a basic coupling type stored in the memory.

An assembling element may be connected to another assembling element through coupling of coupling parts. The assembling element may be connected to another assembling element such that the relative position is fixed. The assembling element may be connected to another assembling element such that the relative position can be changed.

Figure 16:
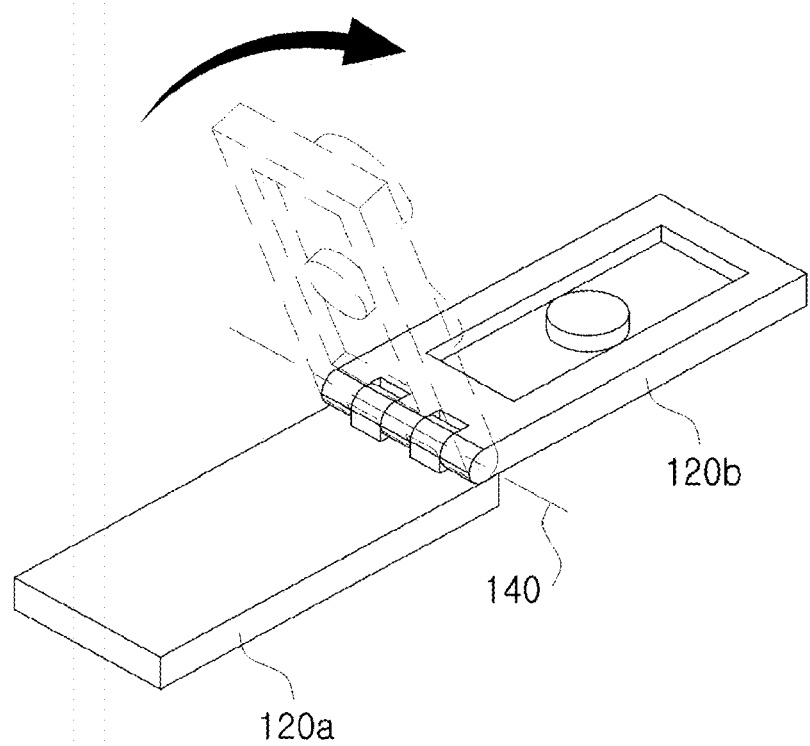
FIG. 16 is a diagram relating to a connection between assembling elements, a relative position of which can be changed, according to an embodiment.

FIG. 16 is a diagram relating to a connection between assembling elements, a relative position of which can be changed, according to an embodiment. Referring to FIG. 16, a relative position between a hinge tile type first assembling element 120a and a hinge plate type second assembling element 120b may be reversibly changed by an external force. Specifically, the first assembling element 120a and the second assembling element 120b are turned about a virtual rotation axis 140 formed by coupling parts of the first assembling element 120a and the second assembling element 120b, whereby the angle between the assembling elements may be changed.

An assembling element may be connected to another assembling element in various directions. For example, an assembling element may be connected to another assembling element in a direction, such as upward, downward, lateral, upward lateral, and downward lateral directions.

Figure 17:
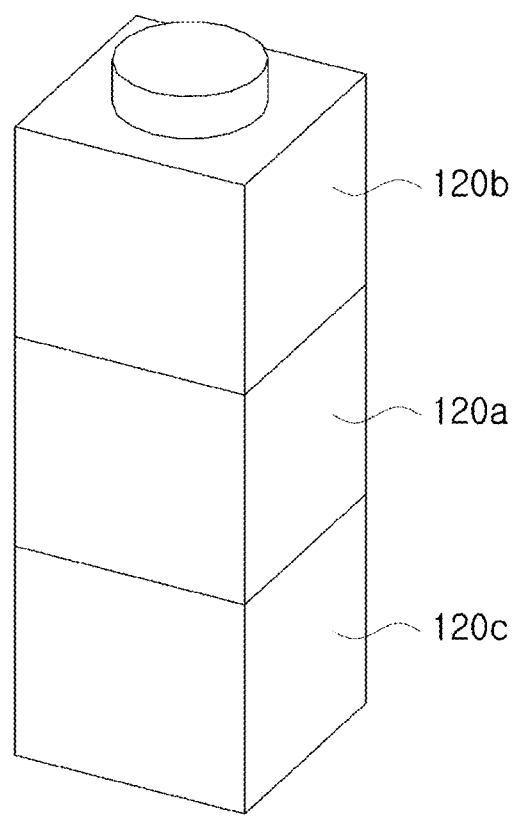
Figure 19:
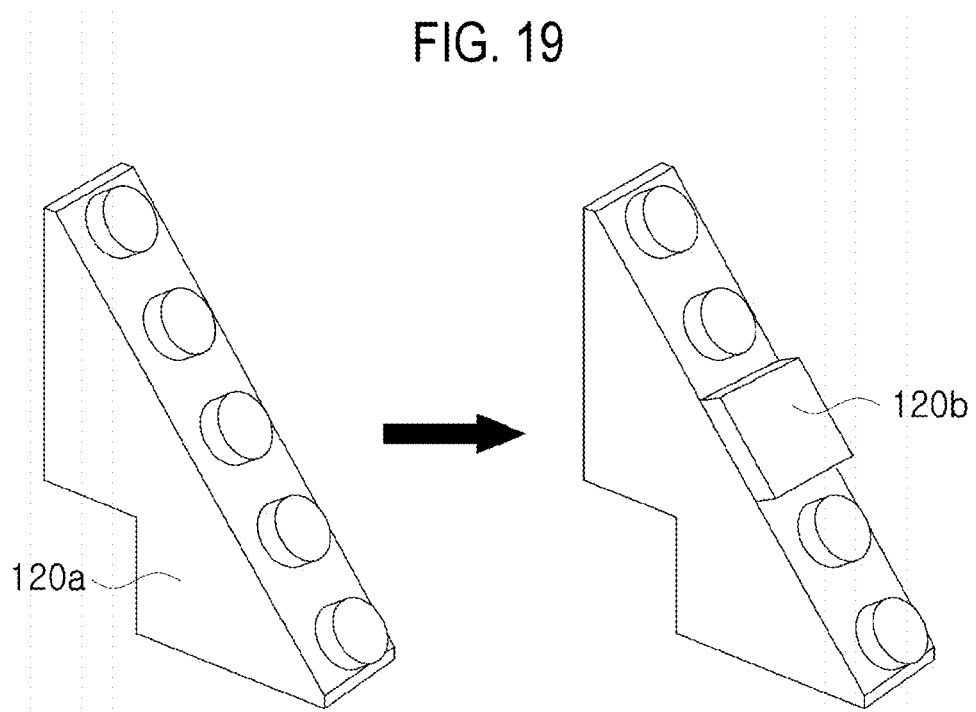

In consideration of the relative position of an assembling element in an assembling toy, the connection direction of the assembling element may be determined. FIGS. 17 to 19 are diagrams relating to a connection direction of assembling elements according to an embodiment. Referring to FIG. 17, a second assembling element 120b may be connected to an upper portion of a first assembling element 120a through a coupling part formed on an upper surface of the first assembling element 120a, and a third assembling element 120c may be connected to a lower portion of the first assembling element 120a through a coupling part formed on a lower surface of the first assembling element 120a. Referring to FIG. 18, a second assembling element 120b may be connected to a side portion of a first assembling element 120a through a coupling part formed on a side surface of the first assembling element 120a. Referring to FIG. 19, a second assembling element 120b may be connected to an upward lateral portion of a first assembling element 120a through a coupling part formed on an upward lateral surface of the first assembling element 120a.

If a relative position between assembling elements connected can be changed, each surface of the assembling elements may be determined by various criteria. For example, each surface may be determined on the basis of a particular shape of an assembling element, which is designated by a user. Each surface may be determined on the basis of a predesignated shape for each assembling element.

Figure 20:
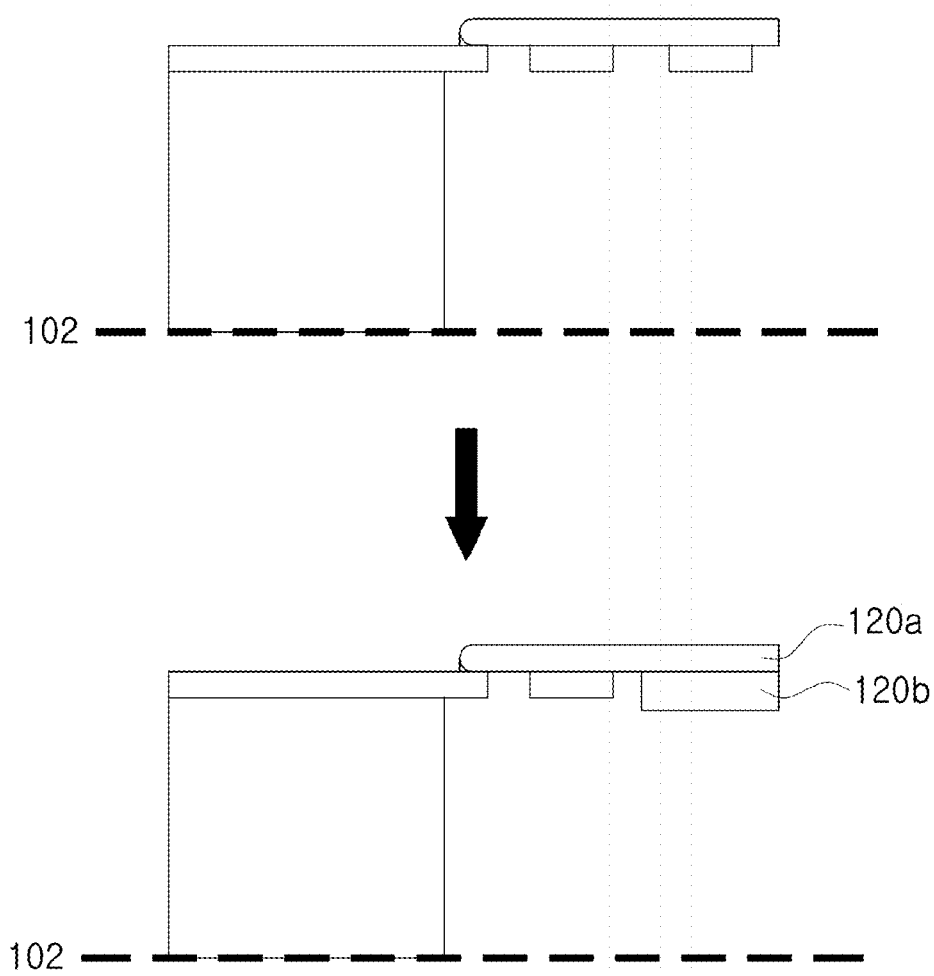
FIGS. 20 and 21 are diagrams relating to a connection direction of assembling elements in consideration of a coupling part according to an embodiment.

In consideration of the type of a coupling part used to connect an assembling element, the connection direction of the assembling element may be determined. For example, in a case where a stud of a first assembling element and a cavity of a second assembling element are coupled, the second assembling element may be considered to be connected to an upper portion of the first assembling element. FIG. 20 is a diagram relating to a connection direction of an assembling element in consideration of a coupling part according to an embodiment. Referring to FIG. 20, in a case of determination based on a ground 102, a second assembling element 120b may be determined to be connected to a lower portion of a first assembling element 120a. However, in a case of determination considering the type of a coupling part, a stud of the first assembling element 120a and a cavity of the second assembling element 120b are coupled to each other, and thus the second assembling element 120b may be determined to be connected to an upper portion of the first assembling element 120a.

Figure 21:
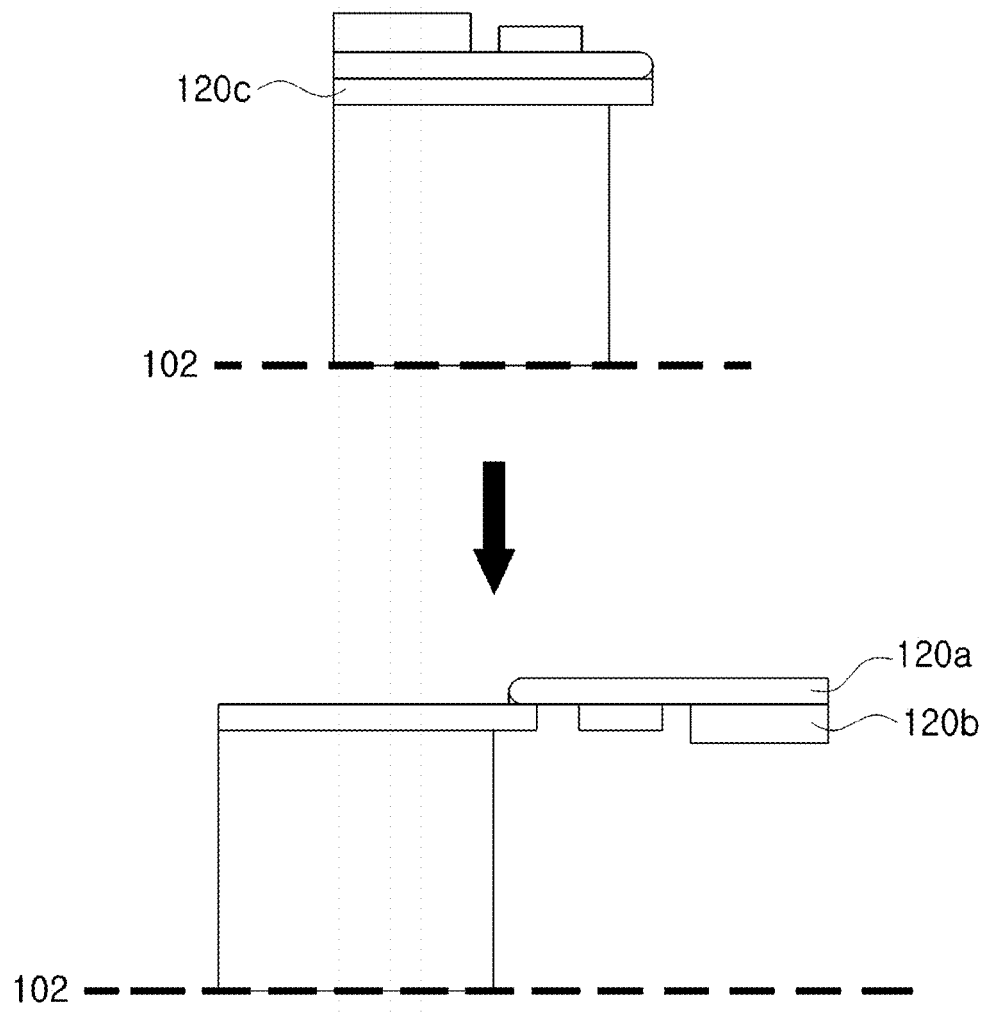

In a case where the connection direction of an assembling element is determined in consideration of the type of a coupling part used to connect the assembling element, even if a relative position between assembling elements is changed, the connection direction may not be changed. FIG. 21 is a diagram relating to a connection direction of an assembling element according to an embodiment. Referring to FIG. 21, a relative position between a hinge tile type third assembling element 120c and a hinge plate type first assembling element 120a may be changed. However, if a connection direction is determined in consideration of the type of a coupling part, a stud of the first assembling element 120a and a cavity of a second assembling element 120b are coupled to each other, and thus the second assembling element 120b may be determined to be connected to an upper portion of the first assembling element 120a regardless of the relative position between the third assembling element 120c and the first assembling element 120a.

An assembling element may include an upper surface, a lower surface, and a side surface. A criterion determining each surface of an assembling element may vary.

Figure 22:
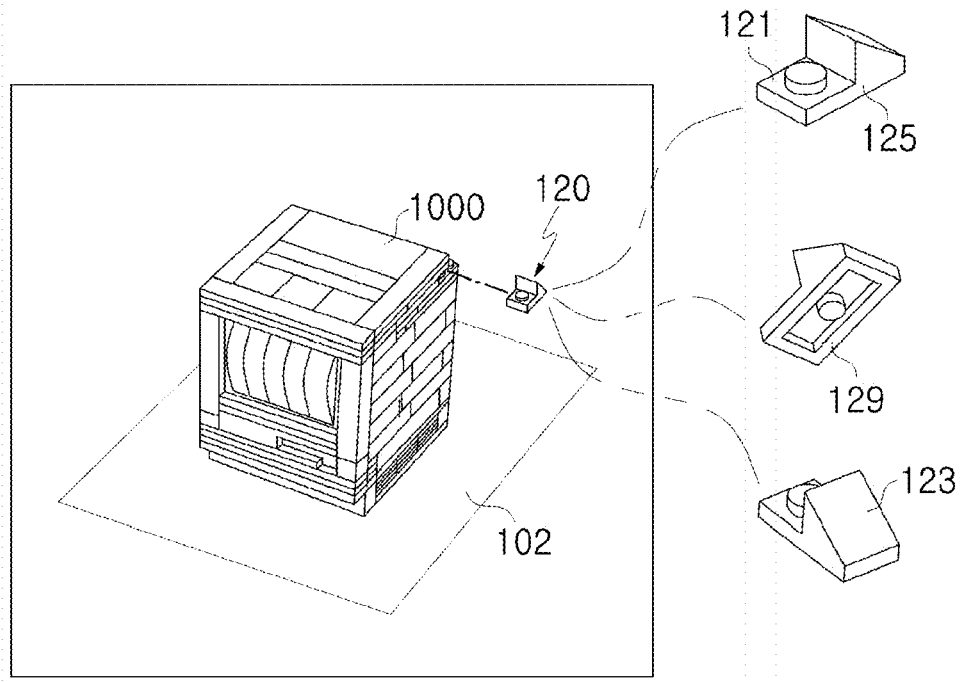
FIGS. 22 and 23 are diagrams relating to each surface of an assembling element according to an embodiment.

The upper surface, lower surface, and side surface of the assembling element may be determined on the basis of a ground with respect to the assembling element having been assembled to an assembling toy. FIG. 22 is a diagram relating to each surface of an assembling element according to an embodiment. Referring to FIG. 22, after an assembling element 120 included in an assembling toy 1000 having a shape of a monitor is assembled into the assembling toy 1000, the assembling element may include an upper surface 121, a side surface 125, and a lower surface 129 with respect to a ground 102. Specifically, the assembling element 120 may include the upper surface 121 and the lower surface 129 which are parallel to the ground 102, and the side surface 125 which is vertical to the ground 102. The assembling element 120 may further include a side surface 123 which is oblique to the ground 102.

If the shape of an assembling element can be changed, each surface of the assembling element may be determined by various criteria. For example, each surface may be determined on the basis of a particular shape of an assembling element, which is designated by a user. Each surface may be determined on the basis of a predesignated shape for each assembling element.

In consideration of the type of a coupling part formed on an assembling element, each surface of the assembling element may be determined. For example, a surface on which a stud is formed may be determined to be an upper surface. A surface on which a cavity is formed may be determined to be a lower surface.

Each surface of an assembling element may be determined in consideration of the distance from a ground. For example, an assembling element may include a shortest distance surface that is parallel to and closest to a ground, among surfaces passing through the assembling element, and a longest distance surface that is parallel to and farthest to the ground, among the surfaces passing through the assembling element.

An upper surface/lower surface and a longest distance surface/shortest distance surface of an assembling element may be identical to or different from each other according to cases.

Figure 23:
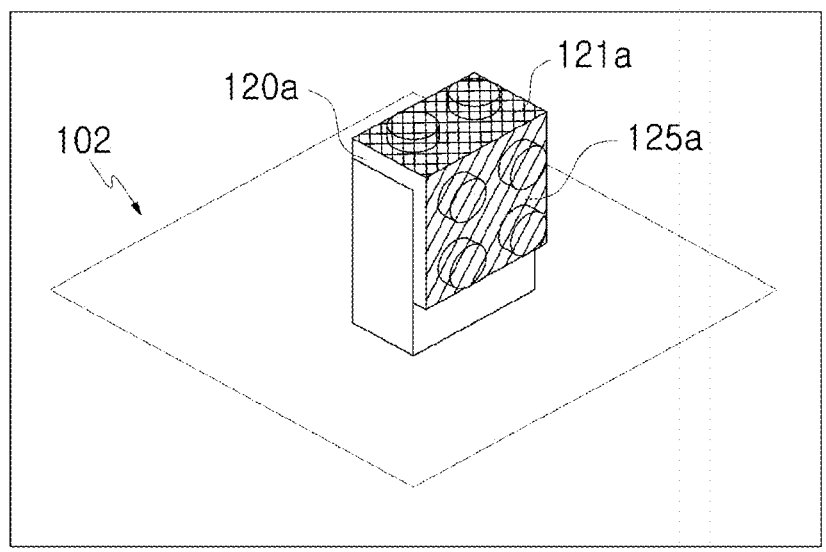

Each surface of an assembling element may be determined by a combination of the above mentioned determination criteria. FIG. 23 is a diagram relating to each surface of an assembling element according to an embodiment. Referring to FIG. 23, in a case where a surface on which a stud is formed is determined to be an upper surface only in consideration of the type of a coupling part, both a first surface 121a and a second surface 125a of a first assembling element 120a may be determined to be an upper surface. If an upper surface is set to be parallel to the ground 102 in additional consideration of a criterion of determination based on the ground 102, only the first surface 121a may be determined to be an upper surface.

An assembling element may have a height. The height may mean the height, from a ground, of the assembling element assembled to an assembling toy. The height may be the height from the ground to a coupling part. The height may be the height from the ground to a surface on which a coupling part is formed.

An assembling element may have a plurality of heights. For example, an assembling element may have an upper surface height which is the height from the ground to an upper surface, and a lower surface height which is the height from the ground to a lower surface. An assembling element may have a highest height which is the height from the ground to a highest point, and a lowest height which is the height from the ground to a lowest point.

FIG. 24 is a diagram relating to a determination of a height of an assembling element according to an embodiment. The following description will be given under the assumption that a first surface 121a of a first assembling element 120a is determined to be an upper surface, and a second surface 125a is determined to be a side surface. Referring to FIG. 24, an upper surface height of the first assembling element 120a may be the height from a ground 102 to an upper surface 121, and a lower surface height may be the height from the ground 102 to a lower surface 129. A lowest height of the first assembling element may be the height from the ground 102 to a lowest point 129a.

A highest height and/or lowest height of an assembling element may be identical to or different from an upper surface height and/or a lower surface height. Referring to FIG. 24, it may be noted that the highest height of the first assembling element 120a is identical to the upper surface height, and the lowest height is different from the lower surface height.

Hereinafter, determination of an assembly sequence of assembling elements will be described. An assembly sequence of assembling elements is expressed as a natural number. The assembly sequence should be interpreted as meaning in what ordinal stage of an instruction the assembling element is assembled, rather than meaning a sequence according to which an individual assembling element is assembled. For example, if m number of assembling elements are assembled in an n-th stage of an instruction, the m number of assembling elements have an n-th assembly sequence. Hereinafter, assembling elements assembled in each stage of an instruction are expressed as an assembly group, and assembling elements assembled in an n-th sequence, which are assembled according to an n-th instruction, are expressed as an n-th assembly group. In addition, an assembling element previously assembled to an assembling toy is expressed as a previously assembled element, and an assembling element that has not been assembled is expressed as a target assembling element.

An assembly group of a next stage may be determined in consideration of a lower surface height of an assembling element. For example, if there is no previously assembled element, an assembling element contacting a ground and having the smallest lower surface height may be selected as a first assembly group. If there is a previously assembled element, an assembling element having the smallest lower surface height, among the assembling elements connected to the previously assembled element may be selected as an assembly group of a next stage. A detailed assembly sequence determining method will be discussed below.

An assembly group of a next stage may be determined in consideration of a connection relationship with a ground. For example, an assembling element contacting the ground may be selected as an assembly group of a next stage.

Figure 25:
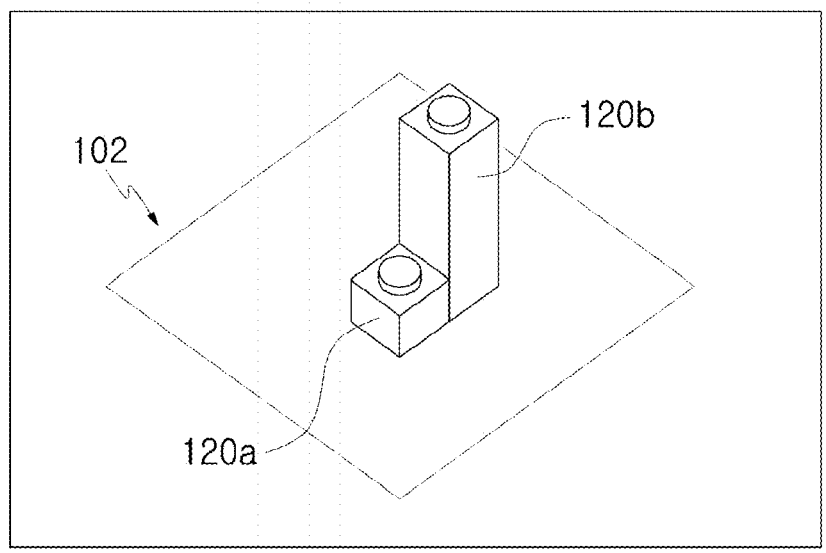
FIG. 25 is a diagram relating to a determination of an assembly sequence of assembling elements according to an embodiment.

If there is no previously assembled element, a first assembly group may be selected from among the assembling elements contacting the ground among target assembling elements. FIG. 25 is a diagram relating to a determination of an assembly sequence of assembling elements according to an embodiment. Referring to FIG. 25, a first assembling element 120a and a second assembling element 120b which are in contact with a ground 102 may be selected as a first assembly group.

A first assembly group may be selected in consideration of an upper surface height of an assembling element contacting the ground. For example, an assembling element having the lowest upper surface height among the assembling elements contacting the ground may be selected as a first assembly group. Referring to FIG. 25, the first assembling element 120a having the smallest upper surface height among the first assembling element 120a and the second assembling element 120b, which are in contact with the ground 102, may be selected as a first assembly group.

If there is a previously assembled element, an assembly group of a next stage may be determined in consideration of a connection relationship between the previously assembled element and a target assembling element. For example, a target assembling element connected to a previously assembled element may be selected as an assembly group of a next stage.

An assembly group of a next stage may be determined in consideration of a direction of the connection with a previously assembled element. For example, a target assembling element connected to an upper portion of a previously assembled element may be selected as an assembly group of a next stage. A target assembling element connected to a lower portion of a previously assembled element may be selected as an assembly group of a next stage.

An assembly group of a next stage may be determined in consideration of a lower surface height of a target assembling element. For example, an assembling element having the lowest lower surface height among target assembling elements may be selected as an assembly group of a next stage.

An assembly group of a next stage may be determined in consideration of an upper surface height of a target assembling element. For example, an assembling element having the lowest upper surface height among target assembling elements may be selected as an assembly group of a next stage.

An assembly group of a next stage may be determined in consideration of both a lower surface height and an upper surface height of a target assembling element. For example, assembling elements having the lowest lower surface height among target assembling elements may be found, and an assembling element having the lowest upper surface height among the found assembling elements may be selected as an assembly group of a next stage.

Even assembling elements belonging to the same assembly group may have different assembly sequences. Hereinafter, assembling elements belonging to the same assembly group and having different assembly sequences are expressed as sub assembly groups. For example, an n-th assembly group assembled in an n-th instruction may include a first sub assembly group and a second sub assembly group, and this means that the second sub assembly group is assembled after the first sub assembly group is assembled. In addition, different stages of instructions may be generated for sub assembly groups, respectively.

Figure 26:
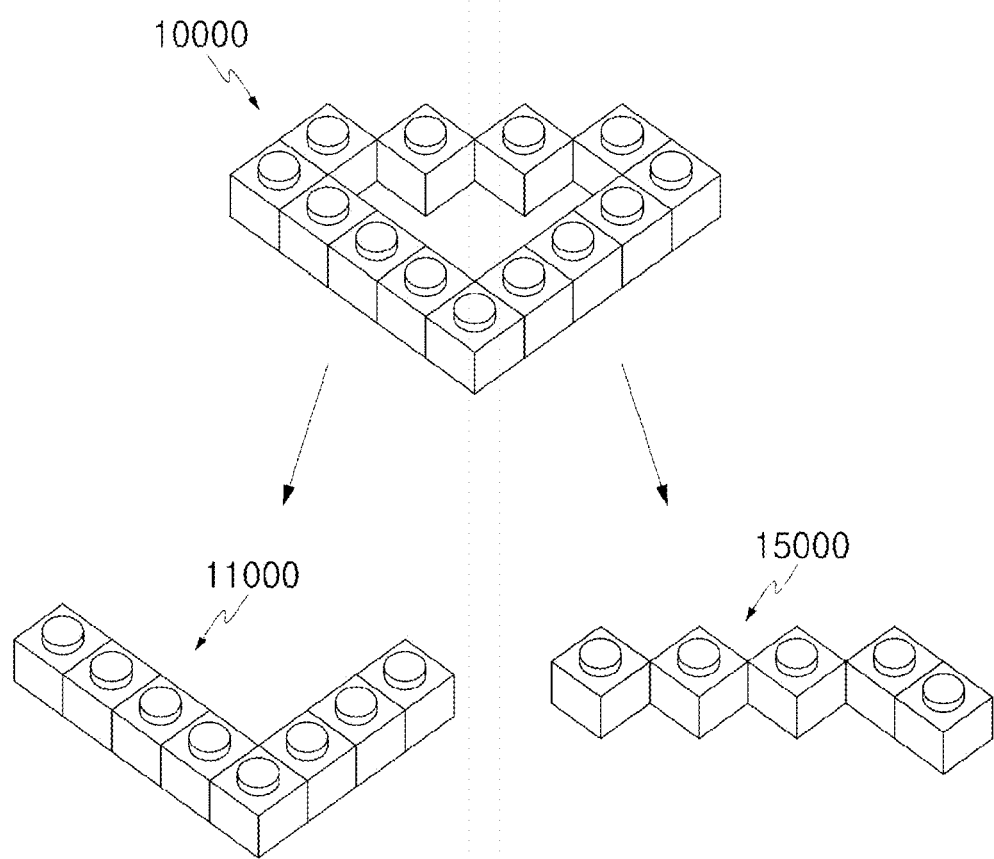
FIG. 26 is a diagram relating to a sub assembly group according to an embodiment.

Whether to generate a sub assembly group may be determined in consideration of the number of assembling elements belonging to an assembly group. For example, if the number of assembling elements exceeds a predetermined value (hereinafter, referred to as "maximum output number"), a sub assembly group may be generated. FIG. 26 is a diagram relating to a sub assembly group according to an embodiment. FIG. 26 illustrates a case where a maximum output number is eight. The number of assembling elements included in an assembly group 10000 is 13, and thus sub assembly groups 11000 and 15000 may be generated.

An assembly group may be divided into a plurality of sub assembly groups in various methods, and the methods are not limited. For example, referring to FIG. 26, a random assembling element included in the assembly group 10000 is selected, and then seven assembling elements connected to the random assembling element are selected, whereby the total of eight assembling elements may be selected as a first sub assembly group 11000, and the remaining assembling elements may be determined as a second sub assembly group 15000. Alternatively, eight random assembling elements may be selected as a first sub assembly group and the remaining assembling elements may be determined as a second sub assembly group.

A separate assembly sequence may be determined for a target assembling element connected to a lower portion of a previously assembled element. A separate instruction may be provided for a target assembling element connected to a lower portion of a previously assembled element.

If there is a target assembling element (hereinafter, referred to as "root element") connected to a lower portion of a previously assembled element, a sub-assembly of an assembling toy including the root element may be defined. For example, the sub-assembly may include a root element and a target assembling element connected to the root element. The sub-assembly may include not only a root element and a target assembling element connected to the root element, but also a target assembling element indirectly connected to the root element through another target assembling element.

If there is a plurality of root elements, a sub-assembly may include a plurality of root elements. The sub-assembly may include a plurality of root elements and a target assembling element connected to the root elements. The sub-assembly may include not only a plurality of root elements and a target assembling element connected to the plurality of root elements, but also a target assembling element indirectly connected to a root element through another target assembling element.

A separate assembly sequence may be determined for a sub-assembly. Alternatively, a separate instruction may be provided for a sub-assembly. The assembly sequence of a sub-assembly may be determined based on an assumption that the sub-assembly is a separate assembling toy. In addition, an assembly sequence determining method disclosed in the present disclosure may be identically applied to an assembly sequence of a sub-assembly.

Assembly sequences of all the assembling elements included in an assembling toy may be generated by a method disclosed in the present disclosure. However, assembly sequences of partial assembling elements may be generated first, and then assembly sequences of the remaining assembling elements may be generated. The partial assembling elements may be selected by a user. Hereinafter, an assembling element, whose assembly sequence is preferentially determined, is referred to as a preferential assembling element.

Figure 27:
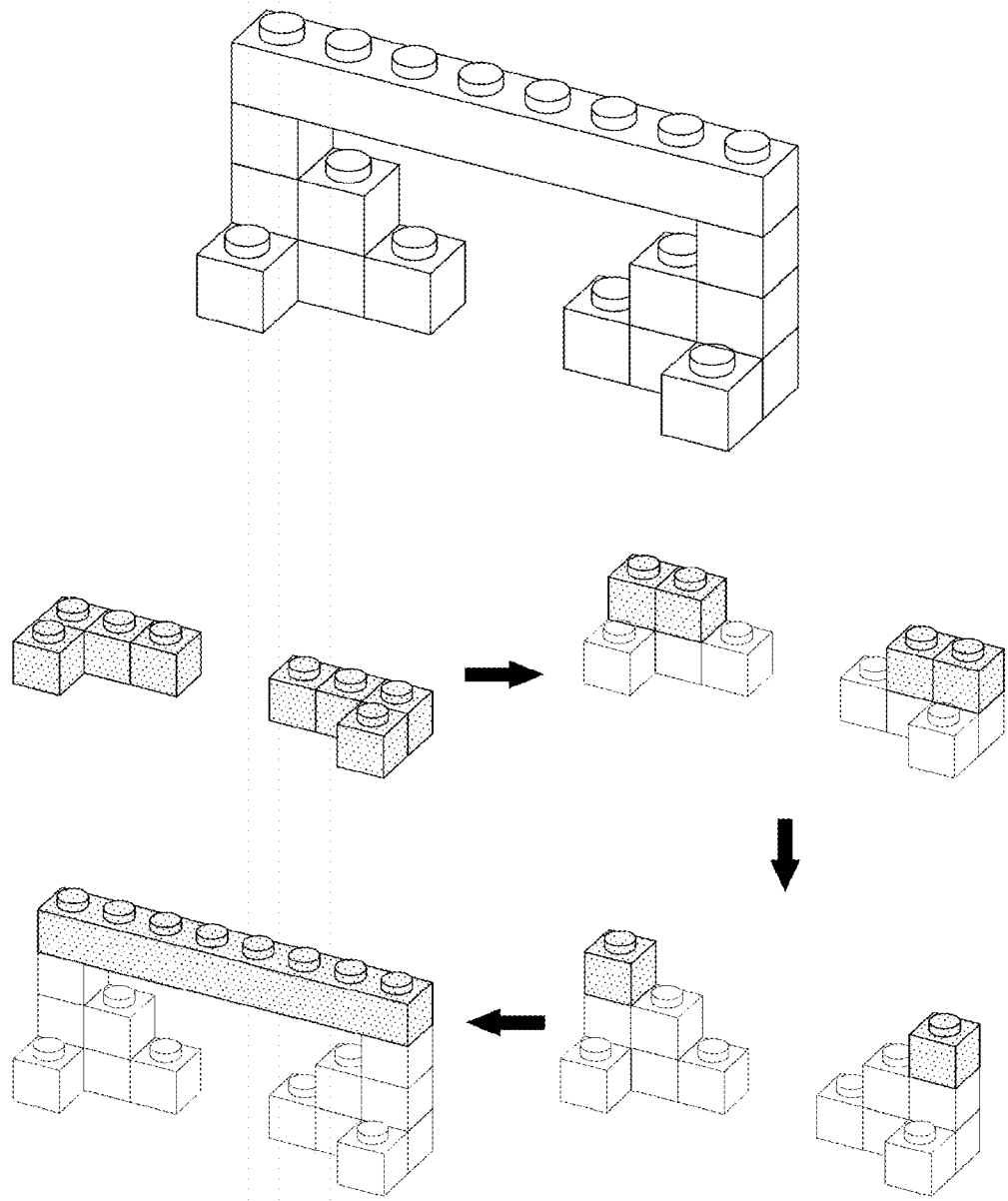
FIGS. 27 and 28 are diagrams relating to generation of an assembly sequence of preferential assembling elements according to an embodiment.
Figure 28:
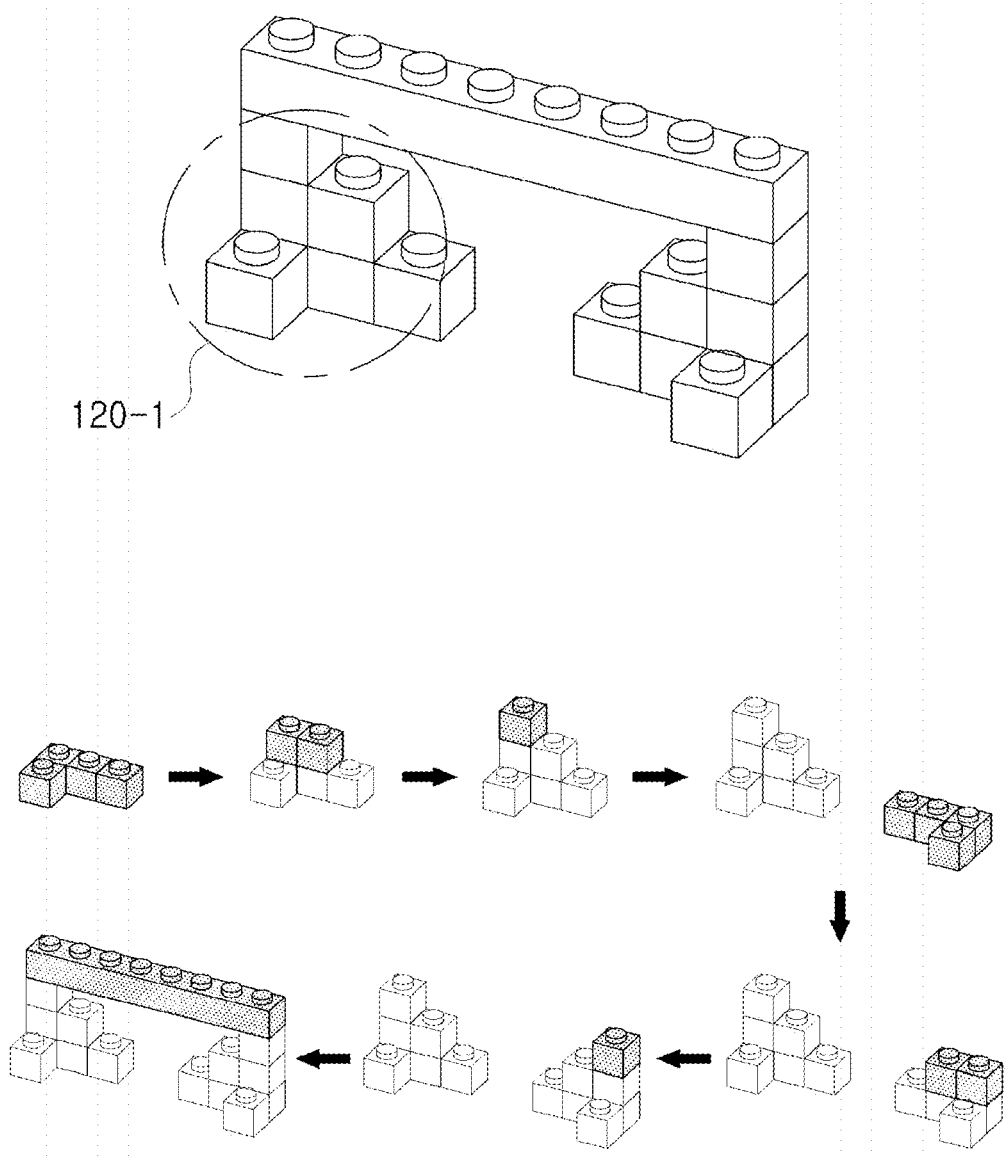

FIGS. 27 and 28 are diagrams relating to generation of an assembly sequence of preferential assembling elements according to an embodiment. FIG. 27 relates to generation of an assembly sequence in a case where there is no preferential assembling element, and assembling is started from an assembling element having a smallest upper surface height. In contrast, FIG. 28 relates to generation of an assembly sequence in a case where there is a preferential assembling element 120-1, and an assembly sequence of the preferential assembling element 120-1 is determined first, and then assembly sequences of the remaining assembling elements are determined.

All the methods disclosed in the present disclosure may be applied to generation of an assembly sequence of preferential assembling elements. In addition, all the methods disclosed in the present disclosure may be applied to generation of assembly sequences of the remaining assembling elements.

After an assembly sequence is determined, a user may modify the assembly sequence. The modification of an assembly sequence by a user may be performed after assembly sequences of all the assembling elements are determined, and may be performed after assembly sequences of only partial assembling elements are determined.

If an assembly sequence of assembling elements is determined through an assembly sequence determining method, an instruction of an assembling toy may be generated on the basis of the assembly sequence.

An instruction of an assembling toy may be generated in a virtual space. An instruction generated in the virtual space may be provided in various types such as two dimensions and three dimensions.

An instruction of an assembling toy may be provided to a user through a display. The instruction may be provided to a user by being output using a medium such as paper.

Figure 29:
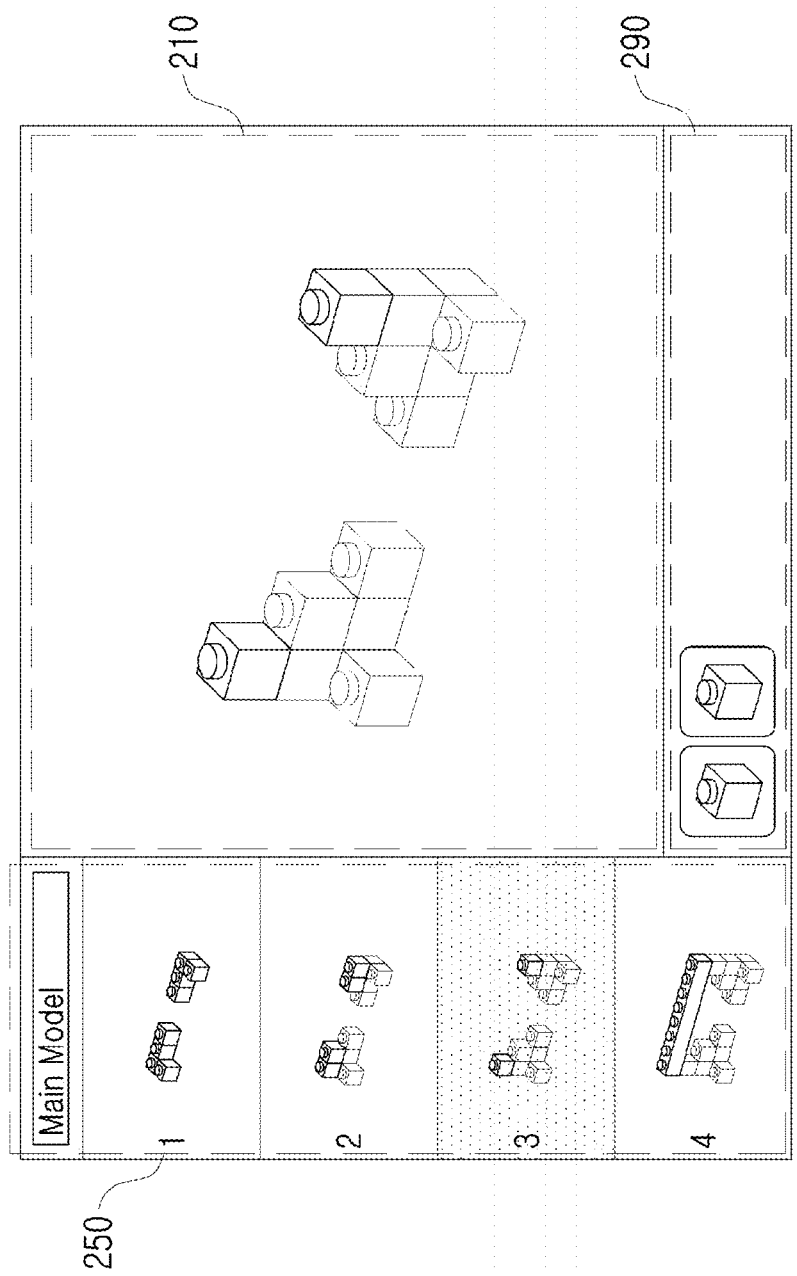
FIGS. 29 and 30 are diagrams relating to an instruction of an assembling toy according to an embodiment.

FIG. 29 is a diagram relating to an example of an instruction of an assembling toy according to an embodiment. Referring to FIG. 29, a main panel 210 may opaquely express an assembly group assembled in a current stage, and may semi-transparently express an assembly group assembled up to a previous stage. A sub panel 250 may sequentially express all the assembly stages by each assembly group. An element panel 290 may express individual assembling elements included in an assembly group assembled in a current stage.

Figure 30:
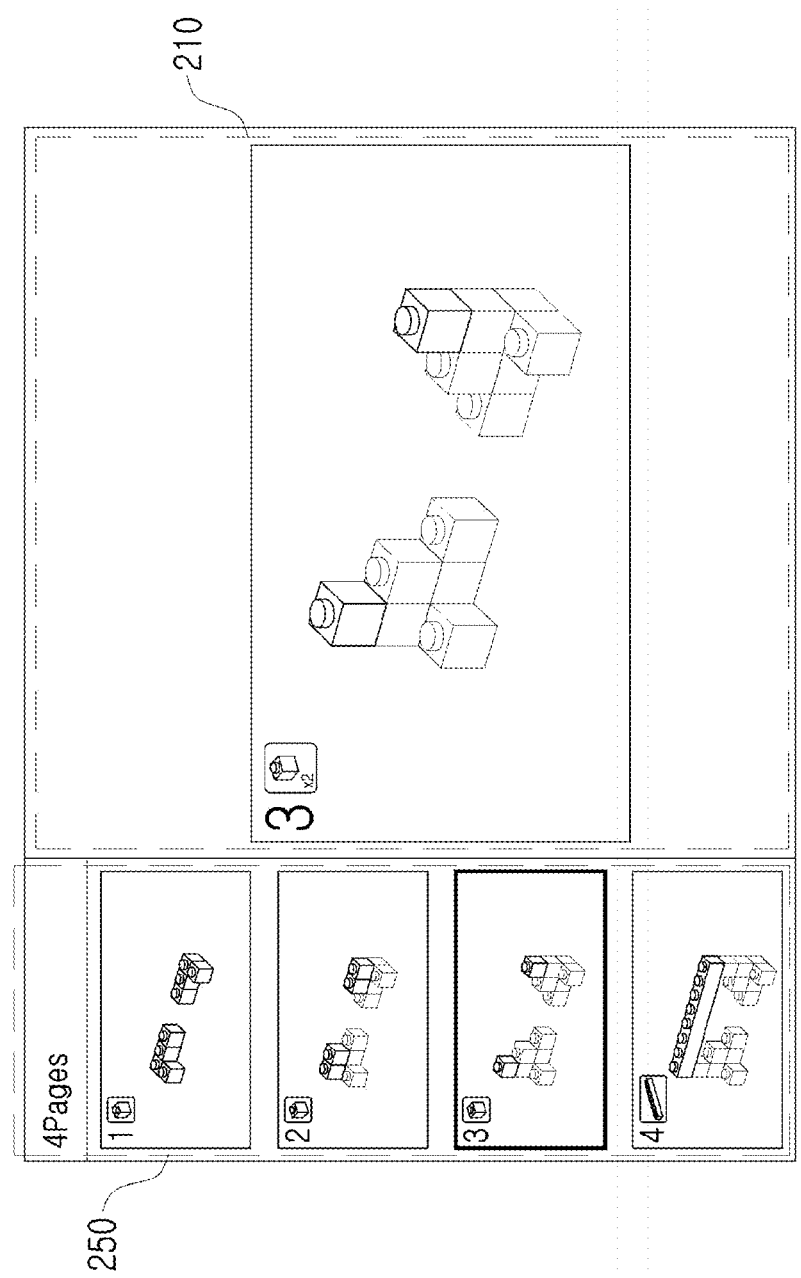

FIG. 30 is a diagram relating to another example of an instruction of an assembling toy according to an embodiment. Referring to FIG. 30, a main panel 210 may express an assembly group assembled in a current stage by emphasizing the assembly group in a center portion of the main panel 210, and may express individual assembling elements included in the assembly group and the number thereof in a left upper end of the main panel 210. In addition, a sub panel 250 may sequentially express all the assembly stages by each assembly group.

After an instruction of an assembling toy is generated, a user can modify the instruction. For example, referring to FIG. 30, the position of an assembling element expressed in the main panel 210 may be changed by a user. In addition, a user can add an additional instruction such as words of guidance.

Figure 31:
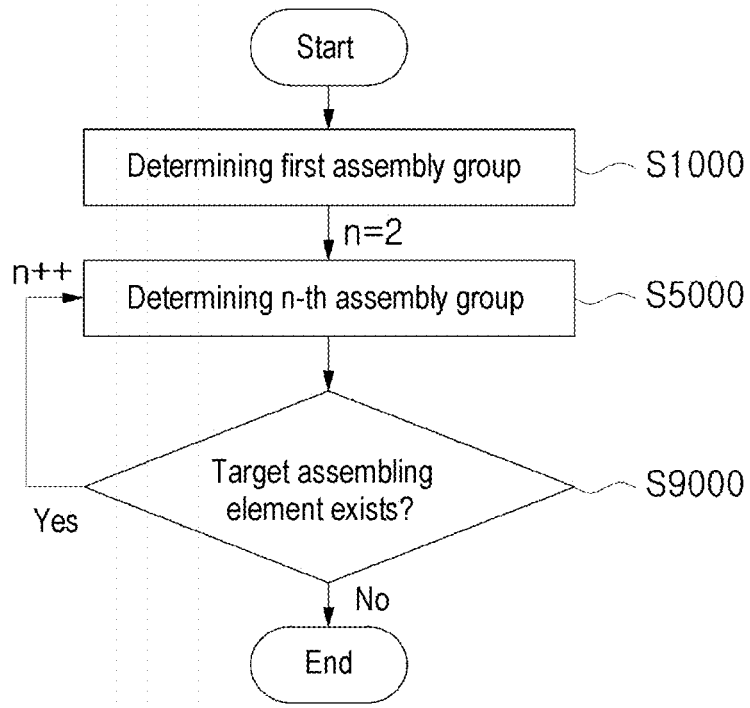
FIG. 31 is a block diagram relating to generation of an assembly sequence of an assembling toy according to an embodiment.

FIG. 31 is a block diagram relating to generation of an assembly sequence of an assembling toy according to an embodiment. Referring to FIG. 31, an assembly sequence may be generated by initially determining a first assembly group (S1000), and then continuously determining an assembly group until there is no more target assembling element (S5000, S9000).

Figure 32:
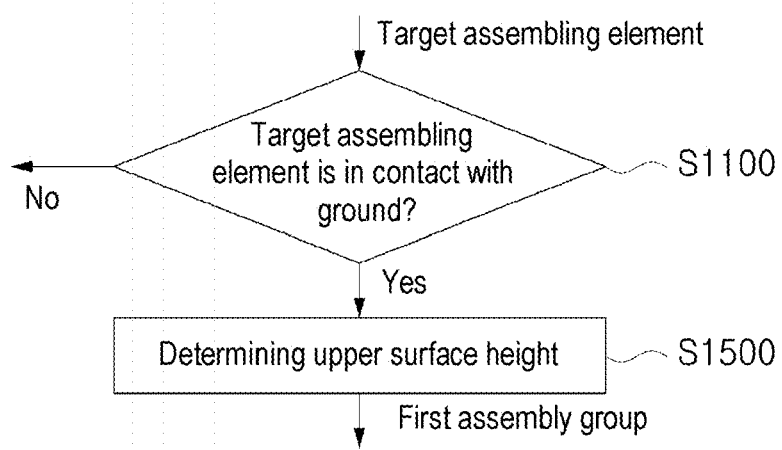
FIG. 32 is a block diagram relating to a determination of a first assembly group according to an embodiment.

FIG. 32 is a block diagram relating to a determination of a first assembly group according to an embodiment. Referring to FIG. 32, whether a target assembling element is in contact with a ground may be determined (S1100), and a first assembly group may be determined in consideration of an upper surface height of the target assembling element contacting the ground (S1500). In this regard, the first assembly group may be an assembling element to be assembled first, and the target assembling elements may be all the assembling elements included in an assembling toy. In addition, the first assembly group may include an assembling element having the smallest upper surface height among the target assembling elements contacting the ground.

Figure 33:
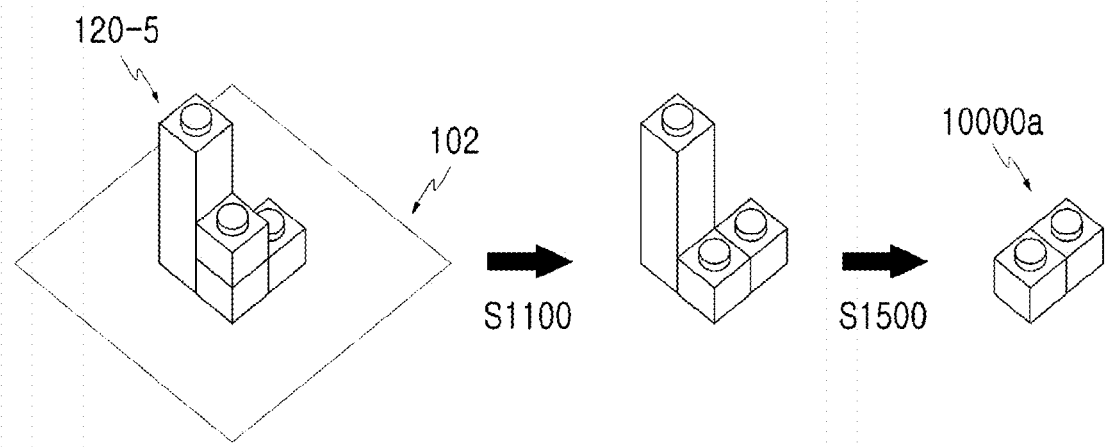
FIG. 33 is a diagram relating to a determination of a first assembly group according to an embodiment.

FIG. 33 is a diagram relating to a determination of a first assembly group according to an embodiment. Referring to FIG. 33, target assembling elements contacting a ground 102 may be determined (S1100), and an assembling element having the smallest upper surface height among the target assembling elements contacting the ground 102 may be selected as a first assembly group 10000a (S1500).

Figure 34:
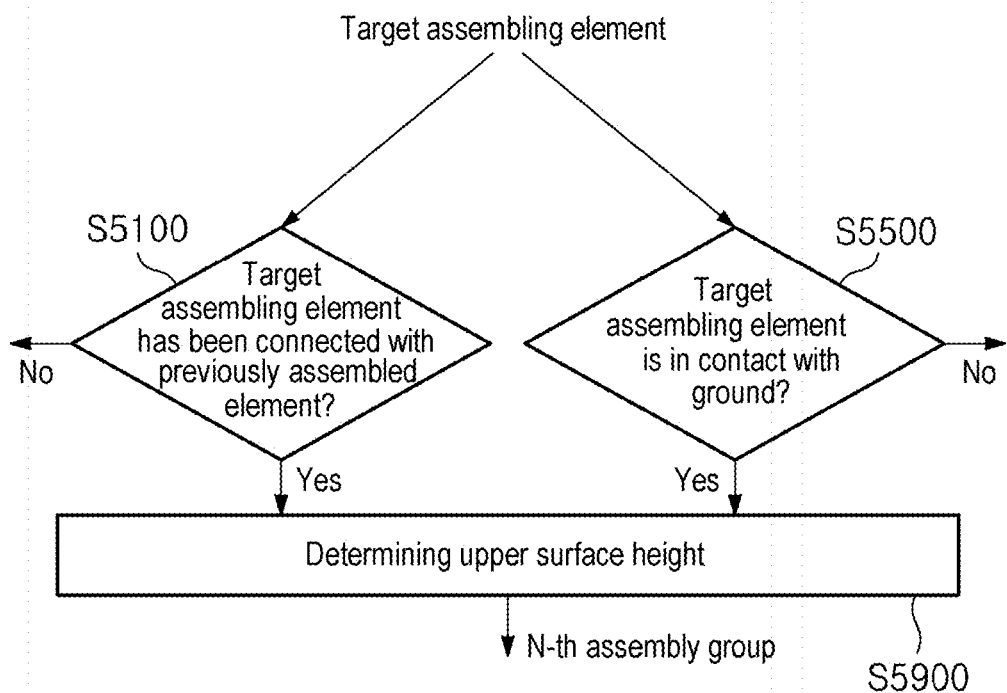
FIG. 34 is a block diagram relating to a determination of an n-th assembly group according to an embodiment.

FIG. 34 is a block diagram relating to a determination of an n-th assembly group according to an embodiment. Referring to FIG. 34, whether target assembling elements have been connected to a previously assembled element (S5100) and whether the target assembling elements are in contact with a ground (S5500) may be determined, and an n-th assembly group may be determined in consideration of an upper surface height of a target assembling element connected to the previously assembled element and an upper surface height of a target assembling element contacting the ground (S5900). The n-th assembly group may include an assembling element having the smallest upper surface height among the target assembling element connected to the previously assembled element and the target assembling element contacting the ground.

Figure 35:
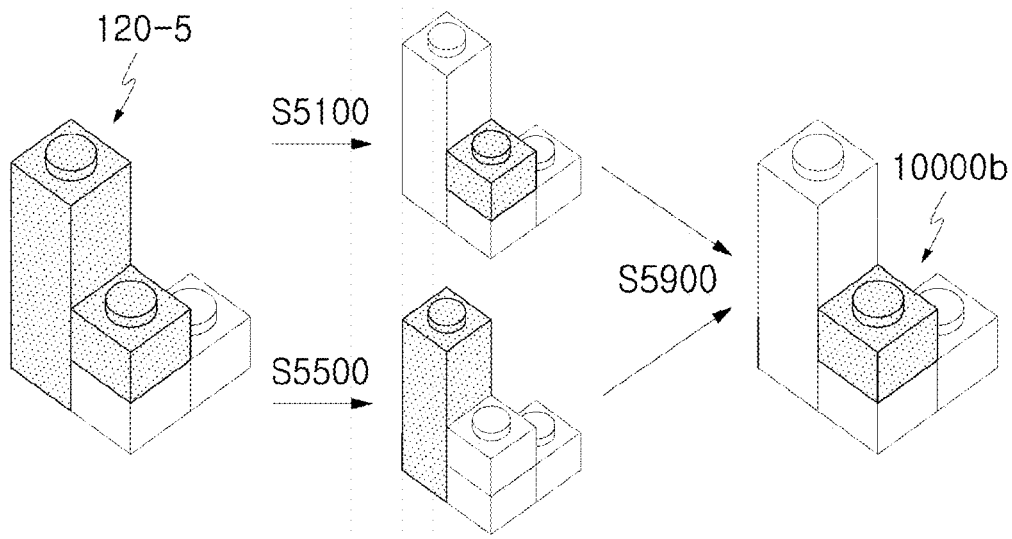
FIG. 35 is a diagram relating to a determination of an n-th assembly group according to an embodiment.

FIG. 35 is a diagram relating to a determination of a second assembly group according to an embodiment, and relates to a determination of an assembly group of a next stage of the determination illustrated in FIG. 33. Referring to FIGS. 33 to 35, whether target assembling elements 120-5 not belonging to the first assembly group among all the assembling elements have been connected to a previously assembled element (S5100) and whether the target assembling elements are in contact with the ground may be determined (S5500), and an assembling element having the smallest upper surface height among a target assembling element connected to the previously assembled element and a target assembling element contacting the ground may be selected as a second assembly group 10000b (S5900).

Figure 36:
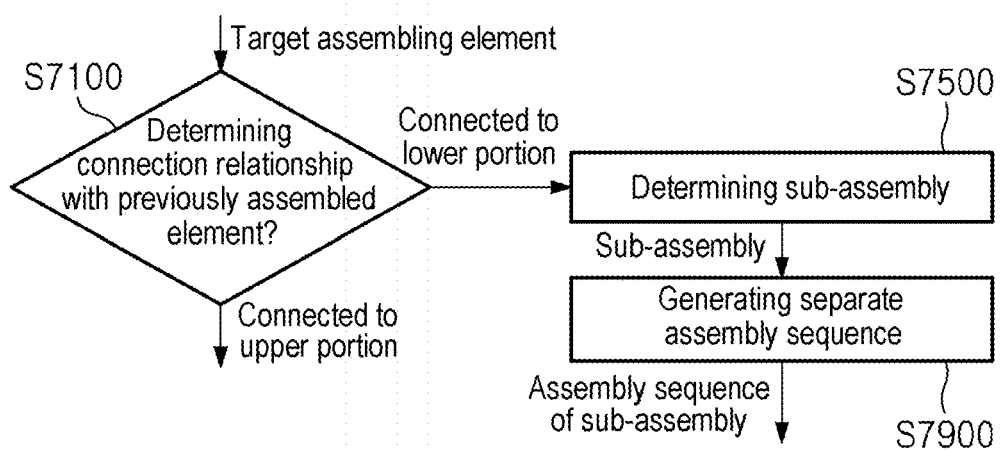
FIG. 36 is a block diagram relating to generation of an assembly sequence of a sub-assembly according to an embodiment.

FIG. 36 is a block diagram relating to generation of an assembly sequence of a sub-assembly according to an embodiment. Referring to FIG. 36, a connection relationship of a target assembling element with a previously assembled element may be determined (S7100). If there is the target assembling element connected to a lower portion of the previously assembled element, a sub-assembly may be determined (S7500) and a separate assembly sequence and/or instruction of the sub-assembly may be provided (S7900).

Figure 37:
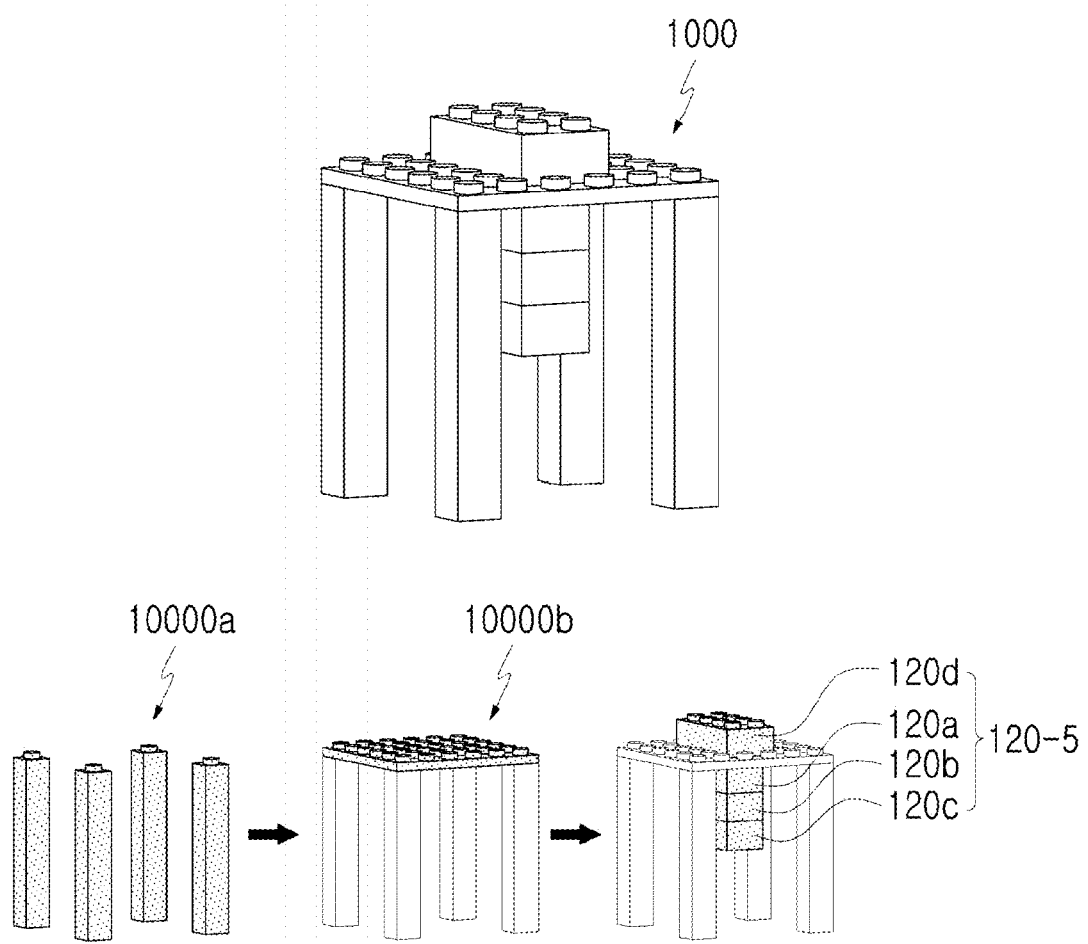
FIG. 37 is a diagram relating to a target assembling element connected to a lower portion of a previously assembled element according to an embodiment.

FIG. 37 is a diagram relating to a target assembling element connected to a lower portion of a previously assembled element according to an embodiment. Referring to FIG. 37, in an assembly sequence determining process of an assembling toy 1000, a first assembly group 10000a and a second assembly group 10000b have already been determined, and a first assembling element 120a to a fourth assembling element 120d correspond to target assembling elements 120-5. The first assembling element 120a connected to a lower portion of the second assembly group 10000b may be selected as a root element. A sub-assembly may include the first assembling element 120a, the second assembling element 120b connected to the first assembling element 120a, and the third assembling element 120c indirectly connected to the first assembling element 120a through the second assembling element 120b.

Figure 38:
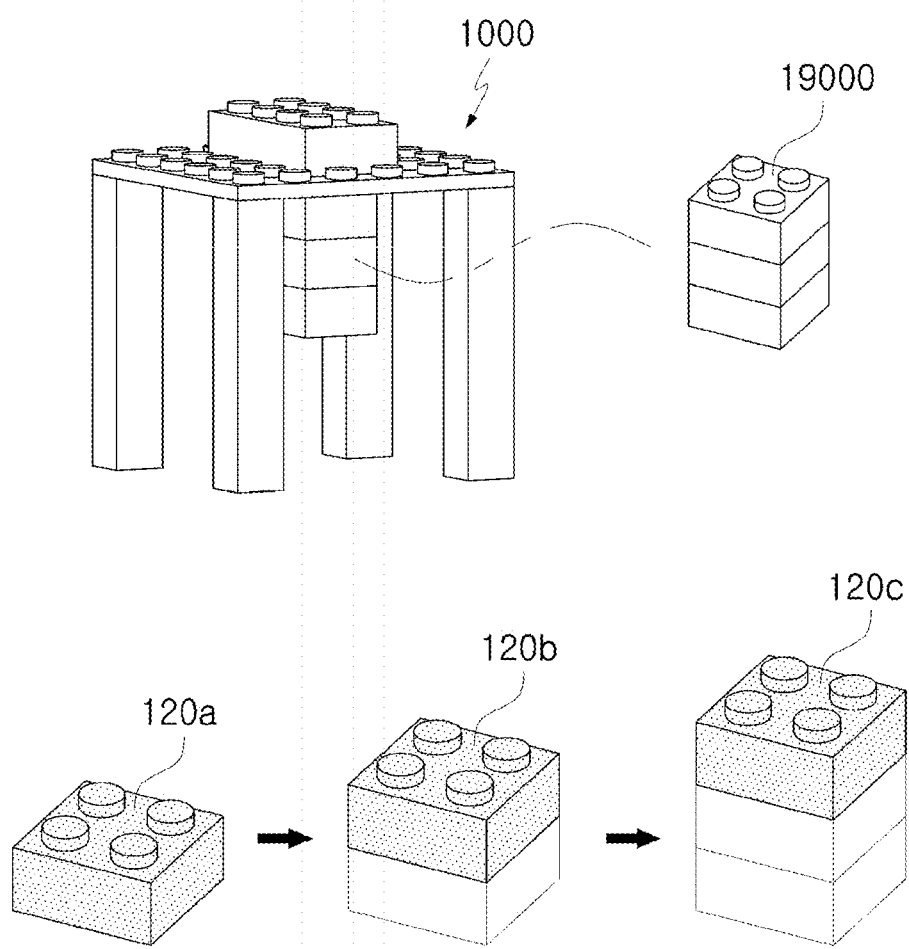
FIG. 38 is a diagram relating to a determination of an assembly sequence of a sub-assembly according to an embodiment.

FIG. 38 is a diagram relating to determination of an assembly sequence of a sub-assembly according to an embodiment. Referring to FIG. 38, in a case where a sub-assembly 19000 is determined from an assembling toy 1000, the sub-assembly 19000 may be considered as a separate assembling toy, a first assembling element 120a contacting a ground may be determined as a first assembly group, a second assembling element 120b connected to the first assembly group may be determined as a second assembly group, and a third assembling element 120c connected to the second assembly group may be determined as a third assembly group, whereby an assembly sequence of the sub-assembly is determined.

At the time of determination of an assembly sequence described in the present disclosure, only a single factor may be considered or a plurality of factors may be considered, and a combination and/or priority thereof may vary.

In addition, the configurations and characteristics of the present disclosure have been described on the basis of the embodiments in the above description, but the present disclosure is not limited thereto. Various modifications or changes within the concept and scope of the present disclosure would be obvious to those skilled in the art. Therefore, it is noted that such modifications or changes fall within the scope of the appended claims.

DESCRIPTION OF REFERENCE SYMBOLS

10: system, 12: controller, 14: memory, 16: input module, 18: display module, 100: virtual space, 102: ground, 104: cell, 110: coupling part, 120: assembling element, 130: body, 140: rotation axis, 200: assembling element palette, 1000: assembling toy, 10000: assembly group, 19000: sub-assembly

The invention claimed is:

1. A computer-implemented method for algorithmically generating an optimized an assembly sequence of an assembling toy including a plurality of assembling elements represented as digital models disposed in a virtual space, each of the assembling elements having at least one coupling part complementarily coupled to another coupling part, being connected to another assembling element through the coupling part, and including a previously assembled element that has been assembled to the assembling toy in the virtual space and a target assembling element that has not been assembled yet, comprising executing on a processor the steps of:
 a. electronically processing the virtual space by:
  receiving user input data through an input module, the user input data comprising commands for manipulating the digital models of assembling elements within the virtual space;
  generating a real-time, interactive image signal for presentation on a display, the image signal visually depicting the digital models of assembling elements and interconnections of the digital models within the virtual space, reflecting the received user input data;
 b. computationally determining an assembly group for a next assembly stage by:
  analyzing digital connectivity data defining coupling relationships between the digital models of previously assembled elements and target assembling elements;
  programmatically identifying target assembling elements that are digitally connected to the previously assembled element;
  calculating a precise upper surface height for each programmatically identified target assembling element, the calculation performed by accessing stored geometric data of the digital models and computing a spatial distance from a defined virtual ground plane within the virtual space to an uppermost point of a digitally designated upper surface of the target assembling element; and
  algorithmically prioritizing the programmatically identified target assembling elements based on a comparative analysis of their calculated upper surface heights to establish the assembly group; and
 c. evaluating, by the processor, whether to algorithmically generate a sub-assembly group, in consideration of the number of the assembling elements included in the assembly group, by:
  comparing the total count to a pre-configured numerical threshold for a single assembly instruction display; and
  responsive to the total count exceeding the threshold, segmenting the determined assembly group into a plurality of distinct sub-assembly groups, each suitable for presentation within a single instructional display frame, thereby optimizing the cognitive load for a user during the assembly process.

2. The method of claim 1, wherein determining the assembly group comprises further consideration of an upper surface height of the target assembling element contacting the ground.

3. The method of claim 2, wherein determining the assembly group comprises determining whether to include at least one target assembling element having a smallest upper surface height among the target assembling element connected to the previously assembled element and the target assembling element contacting the ground.

4. The method of claim 1, wherein determining whether to generate the sub assembly group comprises generating the sub assembly group if the number of the assembling elements included in the assembly group exceeds a predetermined value.

5. The method of claim 1, further comprising outputting an instruction of the assembling toy on the basis of the assembly group.

6. A computer-implemented method for algorithmically generating an optimized assembly instruction sequence for an assembling toy including a plurality of assembling elements represented as digital models disposed in a virtual space, each of the assembling elements having at least one coupling part complementarily coupled to another coupling part, being connected to another assembling element through the coupling part, and including a previously assembled element that has been assembled to the assembling toy in the virtual space and a target assembling element that has not been assembled yet, the method comprising:
 a. electronically processing the virtual space by:
  receiving user input data through an input module, the user input data comprising commands for manipulating the digital models of assembling elements within the virtual space;
  generating a real-time, interactive image signal for presentation on a display, the image signal visually depicting the digital models of assembling elements and interconnections of the digital models within the virtual space, reflecting the received user input data;
 b. computationally determining an assembly group for a next ordinal instruction stage by:
  analyzing digital connectivity data defining coupling relationships between the digital models of previously assembled elements and target assembling elements;
  programmatically identifying target assembling elements that are digitally connected to the previously assembled element;
  calculating a precise upper surface height for each programmatically identified target assembling element, the calculation performed by accessing stored geometric data of the digital models and computing a spatial distance from a defined virtual ground plane within the virtual space to an uppermost point of a digitally designated upper surface of the target assembling element; and
  algorithmically prioritizing the programmatically identified target assembling elements based on a comparative analysis of their calculated upper surface heights to establish the assembly group;
 c. assigning an ordinal stage of instruction to the determined assembly group, wherein the ordinal stage is expressed as a natural number (an n-th assembly sequence), representing an n-th stage of an instruction in which the assembling elements of the assembly group are to be assembled; and d. programmatically evaluating and structuring instructional substages by:

determining whether to generate a sub-assembly group within the determined assembly group, in consideration of a total count of assembling elements included in the assembly group;

comparing the total count to a pre-configured numerical threshold for a single assembly instruction display; and responsive to the total count exceeding the threshold, segmenting the determined assembly group into a plurality of distinct sub-assembly groups;

wherein assembling elements belonging to the same assembly group and having different internal assembly sequences expressed as the sub-assembly groups; and wherein different stages of instructions are computationally generated and assigned to the sub-assembly groups, respectively, such that a subsequent sub-assembly group is instructed for assembly after a preceding sub-assembly group is instructed, thereby optimizing the cognitive load for a user during the assembly process by defining a granular instructional hierarchy.

7. The method of claim 6, wherein determining the assembly group further comprises:

determining whether to include at least one target assembling element having a smallest upper surface height among the target assembling element connected to the upper portion of the previously assembled element and the target assembling element contacting the ground.

8. The method of claim 6, wherein determining the assembly group further comprises:

considering at least one connection between a connection to an upper portion of the previously assembled element, and a connection to a lower portion of the previously assembled element by determining a sub-assembly in consideration of a root element that is a target assembling element connected to the lower portion of the previously assembled element.

9. The method of claim 8, wherein the sub-assembly comprises the root element and the target assembling element connected to the root element.

10. The method of claim 6, further comprising determining whether to generate a sub assembly group in consideration of a quantity of assembling elements included in the assembly group.

11. The method of claim 10, wherein the determining whether to generate the sub assembly group comprises generating the sub assembly group if the number of the assembling elements included in the assembly group exceeds a predetermined value.

12. The method of claim 6, further comprising outputting an instruction of the assembling toy on the basis of the assembly group.

13. The method of claim 6, further comprising changing a predetermined assembly sequence by a user.

14. A computer-implemented method executed by a processor of a computer system for visually presenting an optimized assembly instruction sequence for an assembling toy including a plurality of assembling elements represented as digital models disposed in a virtual space, the processor of the computer system processing the virtual space, each of the assembling elements having at least one coupling part complementarily coupled to another coupling part and being connected to another assembling element through the coupling part, the method comprising:

a. electronically accessing computationally determined assembly instruction sequence data, the data defining a plurality of assembly groups, each associated with a unique ordinal instruction stage, and comprising digital models of assembling elements designated for each group;

b. generating a real-time, interactive image signal for presentation on a display, the image signal visually depicting the digital models of assembling elements within the virtual space, the generation of which includes computationally controlling visual rendering properties, including transparency levels, of the digital models such that:

i. digital models of assembling elements belonging to an assembly group associated with a current instruction stage are rendered with a first transparency level, wherein the first transparency level renders the current assembly group substantially opaque; and ii. digital models of assembling elements belonging to an assembly group or groups associated with one or more previously completed instruction stages are rendered with a second transparency level, wherein the second transparency level renders the previously completed assembly groups semi-transparent, the second transparency level being distinct from the first transparency level to provide clear contextual visual guidance of past and present assembly elements;

c. dynamically updating the image signal in response to user input or progression through the assembly instruction sequence, to reflect changes in the current instruction stage and corresponding transparency levels of the digital models, thereby providing intuitive, real-time visual guidance optimized for complex virtual assembly processes.

\* \* \* \* \*